United States Patent
Struhsaker et al.

(10) Patent No.: US 6,925,516 B2
(45) Date of Patent: Aug. 2, 2005

(54) SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS

(75) Inventors: Paul F. Struhsaker, Plano, TX (US); James S. Denton, Plano, TX (US); Gregory L. McGee, Plano, TX (US)

(73) Assignee: Raze Technologies, Inc., Plano, TX (US)

( * ) Notice: Subject to any disclaimer, the term of this patent is extended or adjusted under 35 U.S.C. 154(b) by 452 days.

(21) Appl. No.: 09/839,513

(22) Filed: Apr. 20, 2001

(65) Prior Publication Data

US 2002/0097564 A1 Jul. 25, 2002

Related U.S. Application Data

(60) Provisional application No. 60/262,824, filed on Jan. 19, 2001.

(51) Int. Cl.[7] .............................. G06F 1/00; H05K 1/14
(52) U.S. Cl. ...................... 710/301; 710/300; 710/302; 710/107; 710/316; 361/736
(58) Field of Search .............................. 710/300–304, 710/2–3, 8–17, 36–40, 305–306, 104–107, 110, 113, 311–317, 101–103, 355–356; 713/1–2, 100; 361/736

(56) References Cited

U.S. PATENT DOCUMENTS

| | | | | |
|---|---|---|---|---|
| 4,882,702 A | * | 11/1989 | Struger et al. ................ 710/2 |
| 5,371,743 A | * | 12/1994 | DeYesso et al. ............. 371/8.1 |
| 5,638,371 A | | 6/1997 | Raychaudhuri et al. ..... 370/347 |
| 5,684,791 A | | 11/1997 | Raychaudhuri et al. ..... 370/278 |
| 5,694,424 A | | 12/1997 | Ariyavisitakul ............. 375/233 |
| 5,809,086 A | | 9/1998 | Ariyavisitakul ............. 375/332 |
| 5,887,144 A | | 3/1999 | Guthrie et al. .............. 395/281 |
| 5,991,292 A | | 11/1999 | Focsaneanu et al. ........ 370/352 |
| 6,009,492 A | * | 12/1999 | Matsuoka .................... 710/305 |
| 6,145,036 A | * | 11/2000 | Barenys et al. ............. 710/300 |
| 6,188,873 B1 | | 2/2001 | Wickman et al. .......... 455/11.1 |
| 6,209,051 B1 | * | 3/2001 | Hill et al. ................... 710/103 |
| 6,230,229 B1 | * | 5/2001 | Van Krevelen et al. ..... 710/131 |
| 6,233,635 B1 | * | 5/2001 | Son ............................ 710/126 |
| 6,253,267 B1 | * | 6/2001 | Kim et al. ................... 710/103 |
| 6,363,437 B1 | * | 3/2002 | Ptasinski et al. ............. 710/10 |
| 6,418,492 B1 | * | 7/2002 | Papa et al. .................. 710/103 |
| 6,591,324 B1 | * | 7/2003 | Chen et al. .................. 710/302 |
| 6,629,172 B1 | * | 9/2003 | Andersson et al. ......... 710/104 |
| 6,675,254 B1 | * | 1/2004 | Wachel ....................... 710/316 |
| 6,721,817 B1 | * | 4/2004 | Khosrowpour ................ 710/8 |
| 6,725,317 B1 | * | 4/2004 | Bouchier et al. ........... 710/312 |
| 6,735,706 B2 | * | 5/2004 | Tomlinson et al. ......... 713/300 |

FOREIGN PATENT DOCUMENTS

| | | |
|---|---|---|
| EP | EP 0 853 270 A1 | 7/1998 |
| GB | 2195028 A * | 3/1988 |

* cited by examiner

*Primary Examiner*—Paul R. Myers
*Assistant Examiner*—Raymond N Phan

(57) ABSTRACT

There is disclosed a system and method for providing an improved common control bus for use in the on-line insertion of line replaceable units (such as circuit board cards) into a backplane of a processor shelf, a modem shelf, or a similar type of equipment. The present invention increases the number of device locations that a common control bus can access. The present invention comprises a complex programmable logic device on a circuit board card that is coupled to a common control bus. The complex programmable logic device is capable of selectively coupling to the common control bus each one of a plurality of device locations on the circuit board card. The complex programmable logic device controls data access to and from each device that is coupled to the common control bus.

20 Claims, 13 Drawing Sheets

SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS

The present invention claims priority to U.S. Provisional Application Ser. No. 60/262,824 filed Jan. 19, 2001.

CROSS-REFERENCE TO RELATED APPLICATIONS

This application claims the benefit of Provisional Application No. 60/262,824, filed Jan. 19, 2001.

The present invention is related to those disclosed in the following United States Provisional and Non-Provisional Patent Applications:

1) Ser. No. 09/713,684, filed on Nov. 15, 2000, entitled "SUBSCRIBER INTEGRATED ACCESS DEVICE FOR USE IN WIRELESS AND WIRELINE ACCESS SYSTEMS";
2) Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION";
3) Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
4) Ser. No. 09/839,729, filed Apr. 20, 2001, entitled "APPARATUS AND METHOD FOR OPERATING A SUBSCRIBER INTERFACE IN A FIXED WIRELESS SYSTEM";
5) Ser. No. 09/839,719, filed Apr. 20, 2001, entitled "APPARATUS AND METHOD FOR CREATING SIGNAL AND PROFILES AT A RECEIVING STATION";
6) Ser. No. 09/838,910, filed Apr. 20, 2001, entitled "SYSTEM AND METHOD FOR INTERFACE BETWEEN A SUBSCRIBER MODEM AND SUBSCRIBER PREMISES INTERFACES";
7) Ser. No. 09/839,509, filed Apr. 20, 2001, entitled "BACKPLANE ARCHITECTURE FOR USE IN WIRELESS AND WIRELINE ACCESS SYSTEMS";
8) Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS";
9) Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
10) Ser. No. 09/839,259, filed Apr. 20, 2001, entitled "REDUNDANT TELECOMMUNICATION SYSTEM USING MEMORY EQUALIZATION APPARATUS AND METHOD OF OPERATION";
11) Ser. No. 09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHOD OF OPERATION";
12) Ser. No. 09/839,075, filed Apr. 20, 2001, entitled "TDD FDD AIR INTERFACE";
13) Ser. No. 09/839,499, filed Apr. 20, 2001, entitled "APPARATUS, AND AN ASSOCIATED METHOD, FOR PROVIDING WLAN SERVICE IN A FIXED WIRELESS ACCESS COMMUNICATION SYSTEM";
14) Ser. No. 09/839,458, filed Apr. 20, 2001, entitled "WIRELESS ACCESS SYSTEM USING MULTIPLE MODULATION";
15) Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
16) Ser. No. 09/838,924, filed Apr. 20, 2001, entitled "APPARATUS FOR ESTABLISHING A PRIORITY CALL N A FIXED WIRELESS ACCESS COMMUNICATION SYSTEM";
17) Ser. No. 09/839,727, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";
18) Ser. No. 09/839,734, filed Apr. 20, 2001, entitled "METHOD FOR ESTABLISHING A PRIORITY CALL IN A FIXED WIRELESS ACCESS COMMUNICATION SYSTEM";
19) Ser. No. 60/262,712, filed on Jan. 19, 2001, entitled "WIRELESS COMMUNICATION SYSTEM USING BLOCK FILTERING AND FAST EQUALIZATION-DEMODULATION AND METHOD OF OPERATION";
20) Ser. No. 60/262,825, filed on Jan. 19, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
21) Ser. No. 60/262,698, filed on Jan. 19, 2001, entitled "APPARATUS AND METHOD FOR OPERATING A SUBSCRIBER INTERFACE IN A FIXED WIRELESS SYSTEM";
22) Ser. No. 60/262,827, filed on Jan. 19, 2001, entitled "APPARATUS AND METHOD FOR CREATING SIGNAL AND PROFILES AT A RECEIVING STATION";
23) Ser. No. 60/262,826, filed on Jan. 19, 2001, entitled "SYSTEM AND METHOD FOR INTERFACE BETWEEN A SUBSCRIBER MODEM AND SUBSCRIBER PREMISES INTERFACES";
24) Ser. No. 60/262,951, filed on Jan. 19, 2001, entitled "BACKPLANE ARCHITECTURE FOR USE IN WIRELESS AND WIRELINE ACCESS SYSTEMS";
25) Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
26) Ser. No. 60/263,097, filed on Jan. 19, 2001, entitled "REDUNDANT TELECOMMUNICATION SYSTEM USING MEMORY EQUALIZATION APPARATUS AND METHOD OF OPERATION";
27) Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";
28) Ser. No. 60/262,955, filed Jan. 19, 2001, entitled "TDD FDD AIR INTERFACE";
29) Ser. No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";
30) Ser. No. 60/273,689, filed Mar. 5, 2001, entitled "WIRELESS ACCESS SYSTEM USING MULTIPLE MODULATION";
31) Ser. No. 60/273,757, filed Mar. 5, 2001, "WIRELESS ACCESS SYSTEM AND ASSOCIATED METHOD USING MULTIPLE MODULATION FORMATS IN TDD FRAMES ACCORDING TO SUBSCRIBER SERVICE TYPE";

32) Ser. No. 60/270,378, filed Feb. 21, 2001, entitled "APPARATUS FOR ESTABLISHING A PRIORITY CALL IN A FIXED WIRELESS ACCESS COMMUNICATION SYSTEM";

33) Ser. No. 60/270,385, filed Feb. 21, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM"; and 34) Ser. No. 60/270,430, filed Feb. 21, 2001, entitled "METHOD FOR ESTABLISHING A PRIORITY CALL IN A FIXED WIRELESS ACCESS COMMUNICATION SYSTEM".

TECHNICAL FIELD OF THE INVENTION

The present invention is directed, in general, to communication network access systems and, more specifically, to a system and method for providing an improved common control bus for use in the on-line insertion of line replaceable units (e.g., circuit board cards) in devices such as processors and modems used in wireless, cable, and wired voice frequency (VF) access systems.

BACKGROUND OF THE INVENTION

Telecommunications access systems provide for voice, data, and multimedia transport and control between the central office (CO) of the telecommunications service provider and the subscriber (customer) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace. To meet these demands, high speed DSL (digital subscriber line) modems and cable modems have been developed and introduced. The digital loop carrier (DLC) architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1 interfaces (1.5 Mbps to 2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to a small percent of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:

1) Relatively high bit error rates (BER) compared to wire line or optical systems; and 2) Transparent operation with network protocols and protocol time constraints for the following protocols:

a) ATM;

b) Class 5 switch interfaces (domestic GR-303 and international V5.2);

c) TCP/IP with quality-of-service QoS for voice over IP (VOIP) (i.e., RTP) and other H.323 media services;

d) Distribution of synchronization of network time out to the subscribers;

3) Increased use of voice, video and/or media compression and concentration of active traffic over the air interface to conserve bandwidth;

4) Switching and routing within the access system to distribute signals from the central office to multiple remote cell sites containing multiple cell sectors and one or more frequencies of operation per sector; and 5) Remote support and debugging of the subscriber equipment, including remote software upgrade and provisioning.

Unlike physical optical or wire systems that operate at bit error rates (BER) of $10^{-11}$, wireless access systems have time varying channels that typically provide bit error rates of $10^{-3}$ to $10^{-6}$. The wireless physical (PHY) layer interface and the media access control (MAC) layer interface must provide modulation, error correction, and automatic retransmission request (ARQ) protocol that can detect and, where required, correct or retransmit corrupted data so that the interfaces at the network and at the subscriber site operate at wire line bit error rates.

The wide range of equipment and technology capable of providing either wireline (i.e., cable, DSL, optical) broadband access or wireless broadband access has allowed service providers to match the needs of a subscriber with a suitable broadband access solution. However, in many areas, the cost of cable modem or DSL service is high. Additionally, data rates may be slow or coverage incomplete due to line lengths. In these areas and in areas where the high cost of replacing old telephone equipment or the low density of subscribers makes it economically unfeasible to introduce either DSL or cable modem broadband access, fixed wireless broadband systems offer a viable alternative. Fixed wireless broadband systems use a group of transceiver base stations to cover a region in the same manner as the base stations of a cellular phone system. The base stations of a fixed wireless broadband system transmit forward channel (i.e., downstream) signals in directed beams to fixed location antennas attached to the residences or offices of subscribers. The base stations also receive reverse channel (i.e., upstream) signals transmitted by the broadband access equipment of the subscriber.

Unfortunately, the diversity of broadband access technology has resulted in a lack of standardization in the broadband access equipment. Cable modems and DSL routers are incompatible with each other and with fiber optic equipment. Different service providers locate broadband access equipment in different locations on the subscriber premises. Often this equipment is located inside the office or residence of the subscriber, which makes it inaccessible to maintenance workers unless the subscriber is present to admit the workers to the premises. The lack of standardization of broadband access equipment and the frequent inaccessibility of such equipment adds to the cost and complexity of broadband access.

Therefore, there is a need in the art for broadband access equipment that can be readily and inexpensively deployed in the large domestic and international markets that are not currently served by wired or wireless broadband access technology. In particular, there is a need for broadband access equipment that provides competitive local exchange carriers (CLECs) a highly cost-effective turnkey facility solution that significantly improves profit margins and service quality. More particularly, there is a need for a subscriber integrated access device that may be easily and inexpensively installed and accessed at the subscriber's premises and that is compatible with different types of wireline and wireless broadband access technologies.

In particular, there is a need in the art for an improved system and method for the on-line insertion of line replaceable units (such as circuit board cards) into a backplane of a device (e.g., a processor shelf or a modem shelf) that is used in wireline or wireless broadband access equipment.

SUMMARY OF THE INVENTION

To address the needs and deficiencies of the prior art, it is a primary object of the present invention to provide, for use in association with wireline or wireless broadband access equipment, a system and method for providing an improved common control bus for use in the on-line insertion of line replaceable units (such as circuit board cards) into a backplane of a processor shelf, a modem shelf, or a similar type of equipment. The expression "on-line insertion" refers to the insertion of a line replaceable unit into a backplane while the backplane is fully powered and operational. During an on-line insertion of a line replaceable unit, it is not necessary to shut down the backplane or take the backplane off-line.

The system and method of the present invention does not employ a separate "common control card" for regulating the on-line insertion process. Instead, the system and method of the present invention employs a concept of "distributed control" in which functions for regulating the on-line insertion process are shared by more than one card within the backplane. The system and method of the present invention also employs the concept of using a "protected bus" so that a circuit board card that is inserted on-line into the backplane remains isolated from the backplane until it has been authorized for full access.

According to an advantageous embodiment of the present invention, the system and method of the present invention comprises a first interface control processor card that is capable of functioning as a primary master controller for circuit board cards within a backplane of a processor shelf, a modem shelf, or a similar type of equipment. The primary master controller comprises a microprocessor and associated circuitry for communicating with circuit board cards located within the backplane. The primary master controller regulates the on-line insertion of circuit board cards into the backplane.

Circuit board cards that are newly inserted into the backplane do not automatically have access to the buses or other cards in the backplane. Circuit board cards that are newly inserted into the backplane also do not automatically have access to full operational power. A newly inserted circuit board card remains isolated until the primary master controller determines the status of the newly inserted circuit board card, configures the newly inserted circuit board card, and authorizes the operation of the newly inserted circuit board card.

According to one advantageous embodiment of the present invention, the system and method of the present invention comprises a second interface control processor card that is capable of functioning as a secondary master controller. The secondary master controller assumes the functions of the primary master controller if the primary master controller fails.

According to another advantageous embodiment of the present invention, the system and method of the present invention comprises an automated boot procedure that enables any circuit board card that is inserted into the backplane (1) to determine whether the inserted circuit board card is a master controller, and (2) if it is a master controller, whether it is a primary master controller or a secondary master controller.

According to still another advantageous embodiment of the present invention, the system and method of the present invention comprises circuit board cards to be inserted into the backplane, where each circuit board card comprises a microprocessor and associated circuitry for communicating with the primary master controller via a common control bus.

According to another advantageous embodiment of the present invention, the system and method of the present invention comprises circuit board cards to be inserted into the backplane, where each circuit board card has a microprocessor and associated circuitry for extending the capabilities of a dual two wire common control bus to address multiple circuits on the circuit board card.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms include and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 14, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged subscriber integrated access device.

Figure 1:
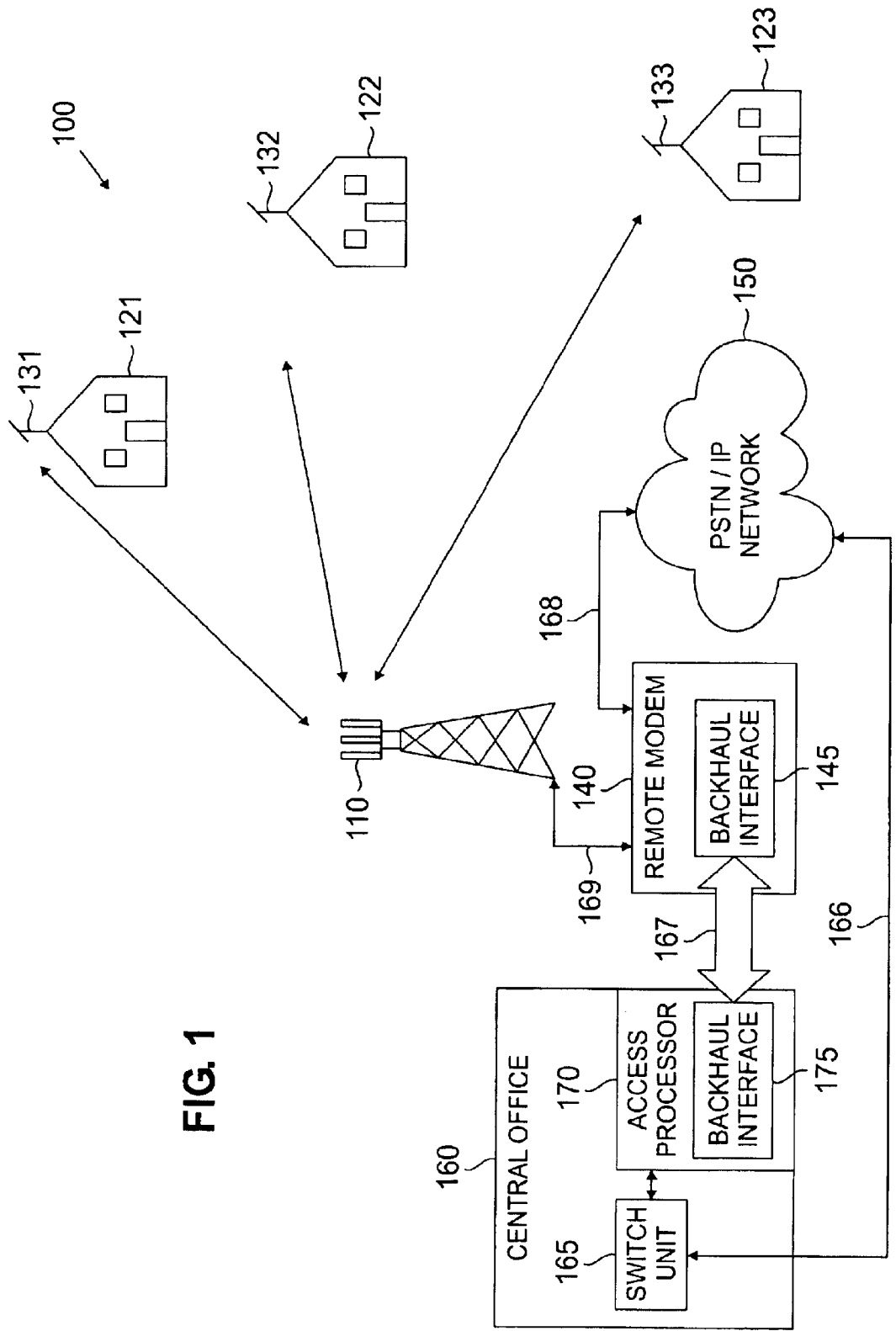
FIG. 1 illustrates an exemplary fixed wireless access network according to one embodiment of the present invention.

FIG. 1 illustrates an exemplary fixed wireless access network 100 according to one embodiment of the present invention. Fixed wireless network 100 comprises a plurality of transceiver base stations, including exemplary transceiver base station 110, that transmit forward channel (i.e., downlink or downstream) broadband signals to a plurality of subscriber premises, including exemplary subscriber premises 121, 122 and 123, and receive reverse channel (i.e., uplink or upstream) broadband signals from the plurality of subscriber premises. Subscriber premises 121–123 transmit and receive via fixed, externally-mounted antennas 131–133, respectively. Subscriber premises 121–123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel (i.e., downlink) signals from external network 150 and transmit the reverse channel (i.e., uplink) signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF remote modem shelf 140, which, among other things, up-converts baseband data traffic received from external network 150 to RF signals transmitted in the forward channel to subscriber premises 121–123. RF remote modem shelf 140 also down-converts RF signals received in the reverse channel from subscriber premises 121–123 to baseband data traffic that is transmitted to external network 150.

RF modem shelf 140 comprises a plurality of RF modems capable of modulating (i.e., up-converting) the baseband data traffic and demodulating (i.e., down-converting) the reverse channel RF signals. In an exemplary embodiment of the present invention, each of the transceiver base stations covers a cell site area that is divided into a plurality of sectors. In an advantageous embodiment of the present invention, each of the RF modems in RF modem shelf 140 may be assigned to modulate and demodulate signals in a particular sector of each cell site. By way of example, the cell site associated with transceiver base station 110 may be partitioned into six sectors and RF modem shelf 140 may comprise six primary RF modems (and, optionally, a seventh spare RF modem), each of which is assigned to one of the six sectors in the cell site of transceiver base station 110. In another advantageous embodiment of the present invention, each RF modem in RF modem shelf 140 comprises two or more RF modem transceivers which may be assigned to at least one of the sectors in the cell site. For example, the cell site associated with transceiver base station 110 may be partitioned into six sectors and RF modem shelf 140 may comprise twelve RF transceivers that are assigned in pairs to each one of the six sectors. The RF modems in each RF modem pair may alternate modulating and demodulating the downlink and uplink signals in each sector.

RF remote modem shelf 140 is located proximate transceiver base station 110 in order to minimize RF losses in communication line 169. RF remote modem shelf 140 may receive the baseband data traffic from external network 150 and transmit the baseband data traffic to external network 150 via a number of different paths. In one embodiment of the present invention, RF remote modem shelf 140 may transmit baseband data traffic to, and receive baseband data traffic from, external network 150 through central office facility 160 via communication lines 166 and 167. In such an embodiment, communication line 167 may be a link in a publicly owned or privately owned backhaul network. In another embodiment of the present invention, RF remote modem shelf 140 may transmit baseband data traffic to, and receive baseband data traffic from, external network 150 directly via communication line 168 thereby bypassing central office facility 160.

Central office facility 160 comprises access processor shelf 170. Access processor shelf 170 provides a termination of data traffic for one or more RF remote modem shelves, such as RF remote modem shelf 140. Access processor shelf 170 also provides termination to the network switched circuit interfaces and/or data packet interfaces of external network 150. One of the principal functions of access processor shelf 170 is to concentrate data traffic as the data traffic is received from external network 150 and is transferred to RF remote modem shelf 140. Access processor shelf 170 provides data and traffic processing of the physical layer interfaces, protocol conversion, protocol management, and programmable voice and data compression.

In an exemplary embodiment of the present invention shown in FIG. 1, external network 150 is the public switched telephone network (PSTN). Remote modem shelf 140 transmits baseband data traffic to, and receives baseband data traffic from, access processor shelf 170, which is located in central office facility 160 of the PSTN. Backhaul interface 145 of remote modem shelf 140 is coupled to backhaul interface 175 of access processor shelf 170 through communication line 167. Communication line 167 may comprise a radio frequency (RF) link, copper cable, optical fiber cable, or any other type of communication line data channel. Access processor shelf 170 is coupled to the public switched telephone network (PSTN) 150 through switch unit 165. Switch unit 165 comprises one or more data processing switches (not shown) such as packet switches or Class 5 switches.

It should be noted that network 100 was chosen as a fixed wireless network only for the purposes of simplicity and clarity in explaining the structure and operation of the backplane of the present invention. The choice of a fixed wireless network should not be construed in any manner that limits the scope of the present invention in any way. As will be explained below in greater detail, in alternate embodiments of the present invention, one or more backplanes of the present invention may be implemented in other types of broadband access systems, including wireline systems (i.e, digital subscriber line (DSL), cable modem, fiber optic, and the like) in which a wireline connected to a subscriber integrated access device carries forward and reverse channel signals.

Figure 2:
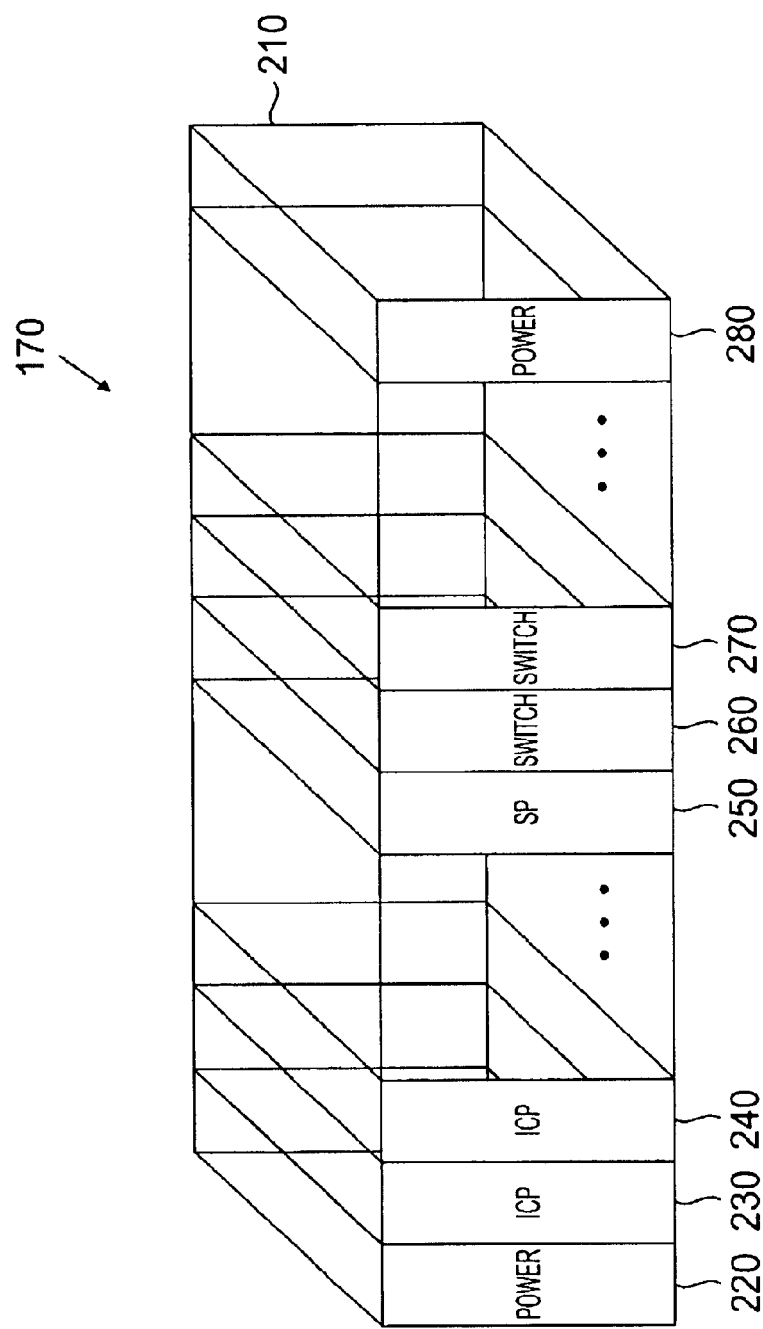
FIG. 2 illustrates an exemplary access processor shelf comprising a backplane in which line replaceable units may be inserted on-line in accordance with the principles of the present invention.

FIG. 2 illustrates exemplary access processor shelf 170 comprising backplane 210 in accordance with the principles of the present invention. Access processor shelf 170 performs a gateway function between the packet and switched circuit telecommunications networks 150 and remote modem shelf 140. Access processor shelf 170 provides data and traffic grooming of the physical layer interfaces, protocol conversion, protocol management, and programmable voice/data compression. As will be more fully discussed, access processor shelf 170 supports "hot swap" or on-line replacement of all line replaceable units (e.g., circuit board cards) within access processor shelf 170.

FIG. 2 illustrates an exemplary placement within backplane 210 of a plurality of circuit board cards 220, 230, . . . , 280 of access processor shelf 170. Backplane 210 and circuit board cards 220, 230, . . . , 280 are contained within a conventional chassis (not shown in FIG. 2). The lower part of the chassis (under the circuit board cards) contains air ingress ports and a fan unit and the upper part of the chassis (above the circuit board cards) contains air egress ports and space for connecting cables. For ease of maintenance, circuit board cards 220, 230, . . . , 280 may be inserted and removed from the front of the chassis.

Access processor shelf 170 comprises two DC power supply cards, 220 and 280. Power supply card 220 (and power supply card 280) coverts forty eight volts (48 V) to three and three tenths volts (3.3 V), and to five volts (5 V) and to twelve volts (12 V) to provide the appropriate power level for the remaining circuit board cards of access processor shelf 170. The use of dual redundant power supply cards, 220 and 280, provides power backup in case one card fails.

Interface control processor (ICP) cards, 230 and 240, provide for shelf control functions, timing recovery and distribution, network interface, backhaul interface, protocol conversion, and resource queue management. Interface control processor (ICP) cards, 230 and 240, also provide a proxy manager for an element management system (EMS) (not shown) that manages control functions, monitor functions, alarm functions, etc. Interface control processor card 230 and interface control processor card 240 each comprise a network processor (not shown) that is capable of receiving software upgrades of network interface protocols.

Possible variants of interface control processor card architecture include: (1) Base line unit with dual T3/E3, octal T1/E1, and dual 10/100 Base-T interfaces, and (2) Dual OC3 and dual 1000 Base-T interfaces, and (3) Dual OC12 and quad 1000 Base-T interfaces. Although two interface control processor cards, 230 and 240, are shown in FIG. 2, in other embodiments access processor shelf 170 may have more than two interface control processor cards.

Signal processing (SP) card 250 provides synchronous voice compression, emergency 911 "cut through"/redial (emergency service), and access network (AN) call progress tone generation and tone detection.

Switch matrix (SM) cards, 260 and 270, provide switching and redundancy support for OC3/OC12 ICP cards, 230 and 240. Although two switch matrix cards, 260 and 270, are shown in FIG. 2, in other embodiments access processor shelf 170 may have more than two switch matrix cards.

Backplane 210 connects all of the above described circuit board cards 220, 230, . . . , 280. As will be more fully described, backplane 210 comprises a dual redundant bus structure and high speed serial star buses that are scalable to OC12 (655 Mbps)/OC48 (2.4x Gbps) transport to redundant switch matrix (SM) cards, 260 and 270.

Figure 3:
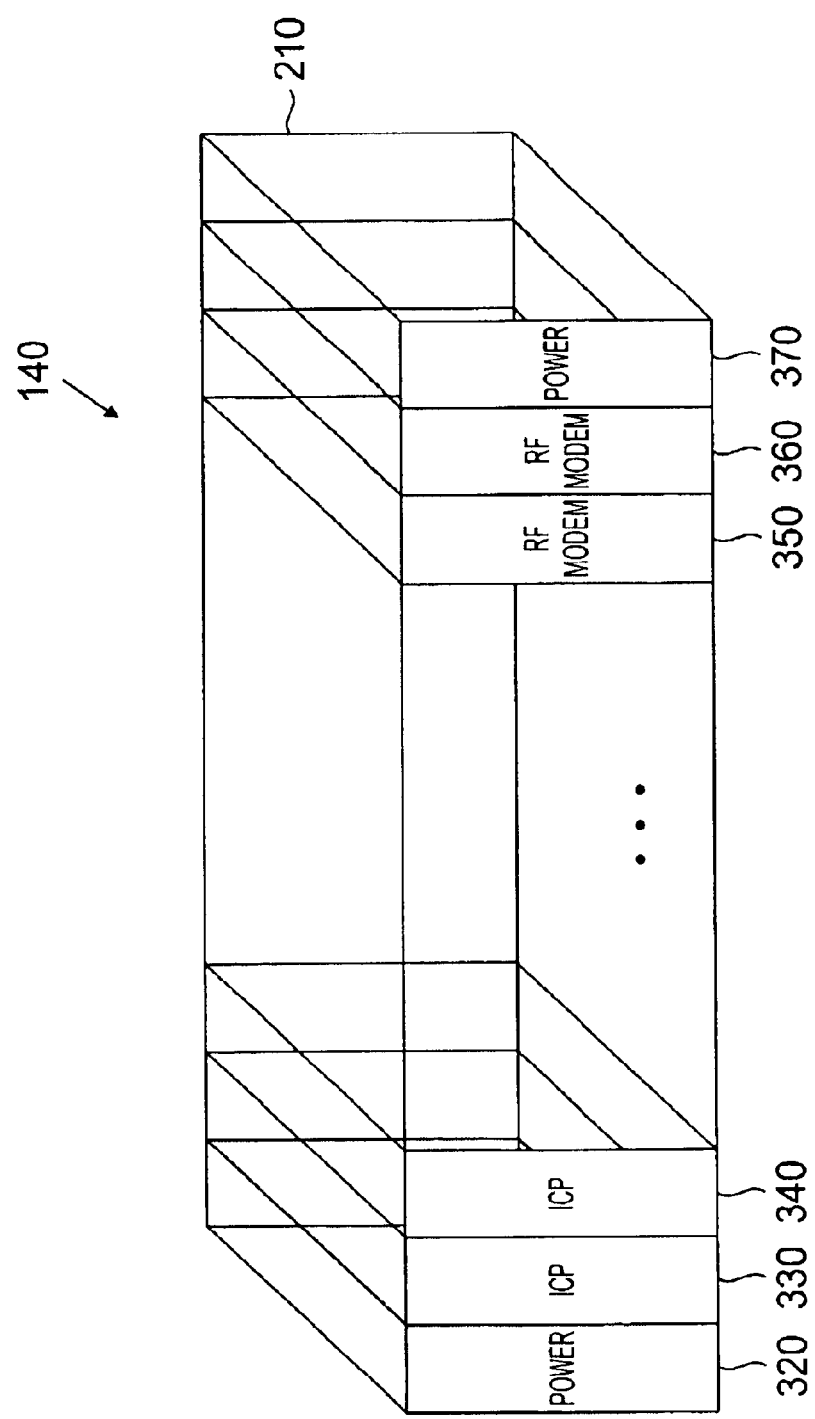
FIG. 3 illustrates an exemplary remote modem shelf comprising a backplane in which line replaceable units may be inserted on-line in accordance with the principles of the present invention.

FIG. 3 illustrates exemplary remote modem shelf 140 comprising backplane 210 in accordance with the principles of the present invention. Remote modem shelf 140 terminates the compressed and concentrated backhaul link of communication line 167 from access processor shelf 170 and routes the traffic to the appropriate radio frequency (RF) modem card for communication through transceiver base station 110 to the appropriate subscriber premises. In one advantageous embodiment remote modem shelf 140 provides support for up to six (6) cell sectors of transceiver base station 110. As will be more fully discussed, remote modem shelf 140 supports "hot swap" or on-line replacement of all line replaceable units (e.g., circuit board cards) within remote modem shelf 140.

FIG. 3 illustrates an exemplary placement within backplane 210 of a plurality of circuit board cards 320, 330, . . . 370 of remote modem shelf 140. Backplane 210 and circuit board cards 320, 330, . . . , 370 are contained within a conventional chassis (not shown in FIG. 3). The lower part of the chassis (under the circuit board cards) contains air ingress ports and a fan unit and the upper part of the chassis (above the circuit board cards) contains air egress ports and space for connecting cables. For ease of maintenance, circuit board cards 320, 330, . . . , 370 may be inserted and removed from the front of the chassis.

Remote modem shelf 140 comprises two DC power supply cards, 320 and 370. Power supply card 320 (and power supply card 370) coverts forty eight volts (48 V) to three and three tenths volts (3.3 V), and to five volts (5 V) and to twelve volts (12 V) to provide the appropriate power level for the remaining circuit board cards of remote modem shelf 140. The use of dual redundant power supply cards, 320 and 370, provides power backup in case one card fails.

Remote modem shelf 140 contains interface control processor (ICP) cards, 330 and 340. In a manner similar to that of the interface control processor cards, 230 and 240, in access processor shelf 170, interface control processor cards, 330 and 340, provide for shelf control functions, timing recovery and distribution, network interface, backhaul interface, protocol conversion, and resource queue management. Interface control processor (ICP) cards, 330 and 340, also provide a proxy manager for an element management system (EMS) (not shown) that manages control functions, monitor functions, alarm functions, etc. Interface control processor card 330 and interface control processor card 340 each comprise a network processor (not shown) that is capable of receiving software upgrades of network interface protocols. Although two interface control processor cards, 330 and 340, are shown in FIG. 3, in other embodiments remote modem shelf 140 may have more than two interface control processor cards.

Radio frequency (RF) modem cards, 350 and 360, support aggregate data rates from ten million bits per second (10 Mbps) to one hundred fifty five million bits per second (155 Mbps). The baseband modems of RF modem cards, 350 and 360, use "software radio" architecture and are capable of supporting two (2) simultaneous air interfaces for staged change over to alternate air interfaces that are in the standards process (e.g., IEEE 802.16.3).

Possible variants of frequency utilization that can be supported with RF modem cards, 350 and 360, include: (1) 2.5 GHz to 2.7 GHz ITFS/MMDS, and (2) 5.8 GHz UNII unlicensed band (Tier 3 and Tier 4 markets), (3) 3.4 GHz to 3.7 GHz international fixed wireless access (FWA) band and later domestic employment, and (4) 4.9 GHz domestic fixed wireless. Although two RF modem cards, 350 and 360, are shown in FIG. 3, in other embodiments remote modem shelf 140 may have more than two RF modem cards.

Interface control processor cards, 330 and 340, are also used for control and routing functions and provide both timing and critical time division duplex (TDD) coordinated burst timing for radio frequency (RF) modem cards, 350 and 360 (and for all other RF modem cards that are located within remote modem shelf 140). Interface control processor cards, 330 and 340, also provide shelf to shelf timing for stacked frequency high density cell configurations. Given the remote deployment of remote modem shelf 140, special care must be given to thermal density and thermal management for remote modem shelf 140.

Backplane 210 connects all of the above described circuit board cards 320, 330, . . . , 370. As will be more fully described, backplane 210 comprises a dual redundant bus structure and high speed serial star buses.

Figure 4:
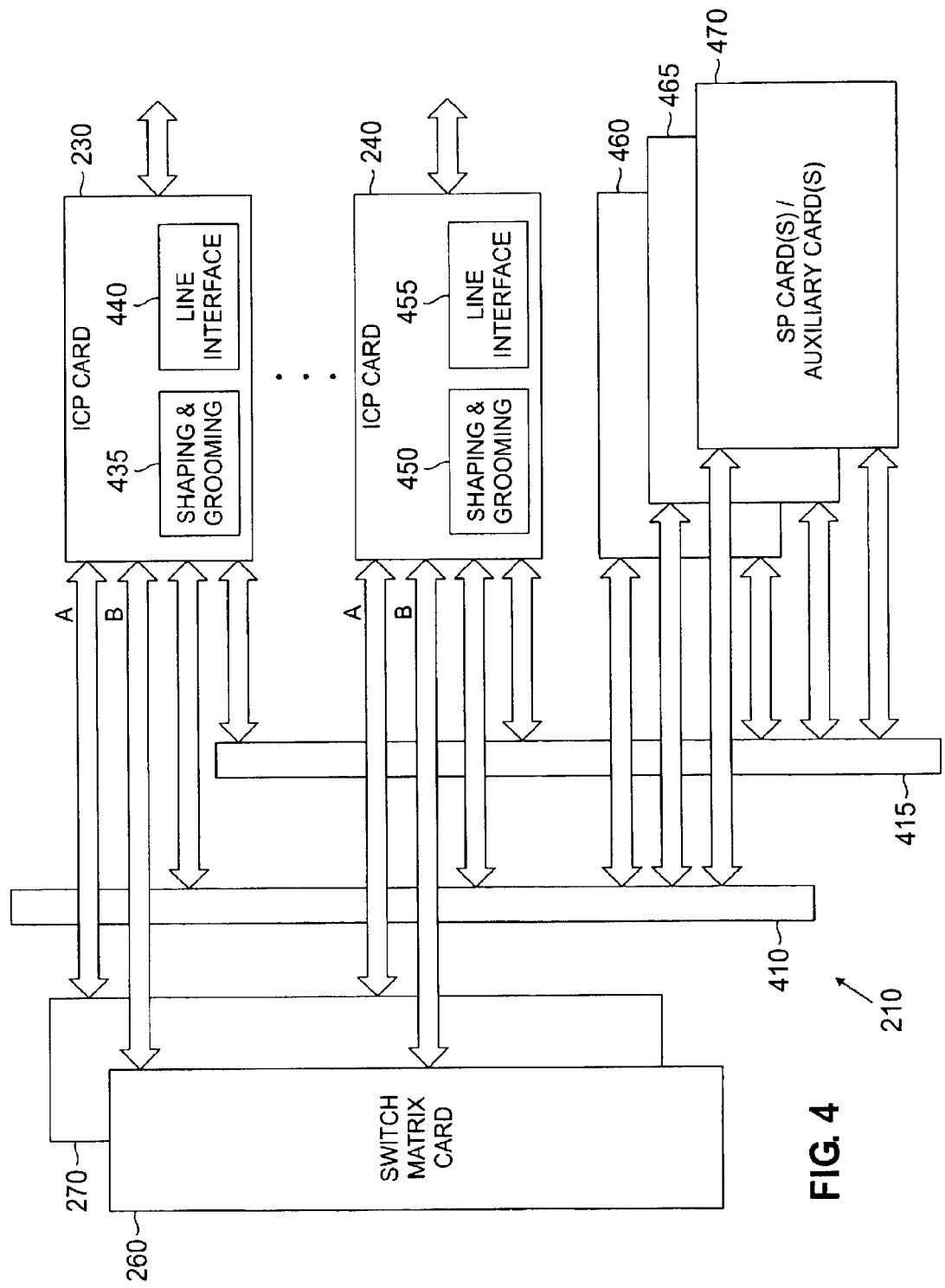
FIG. 4 illustrates a block diagram of an exemplary backplane comprising a two-tiered traffic and switching architecture in which line replaceable units may be inserted on-line in accordance with the principles of the present invention.

FIG. 4 illustrates a block diagram of exemplary backplane 210 of the present invention comprising a two-tiered traffic and switching architecture. Exemplary backplane 210 shown in FIG. 4 is located within access processor shelf 170.

The low tier of backplane 210 comprises low tier bus 410. Low tier bus 410 supports aggregate traffic rates of up to approximately two gigabits per second (2 Gbps). Low tier bus 410 is based on a CellBus™ distributed switching architecture. CellBus™ is a trademark of TransSwitch Corporation. Low tier bus 410 is the principal communications path between interface control processor (ICP) cards, 230 and 240, and signal processing cards/auxiliary processing cards, 460, 465 and 470 in access processor shelf 170. In remote modem shelf 140, low tier bus 410 is the principal communications path between interface control processor (ICP) cards, 330 and 340, and RF modem cards, 350 and 360.

Low tier bus 410 provides support for asynchronous transfer mode (ATM) cell-based traffic between appropriately equipped cards within backplane 210. Low tier bus 410 is a parallel bus architecture consisting of a thirty two (32)

bit data path and associated control signaling. Low tier bus 410 can support a mix of unicast, multicast, and broadcast traffic. Low tier bus 410 provides a switch fabric across backplane 210 by (1) allowing any appropriately equipped card on the input side of the connection to transmit data to any appropriately equipped card on the output side of the connection, and by (2) allowing any appropriately equipped card on the output side of the connection to receive data transmitted from any appropriately equipped card on the input side of the connection.

Low tier bus 410 wraps ATM cells with an additional header and with parity in order to switch cell based traffic according to a connection map maintained by software on each circuit board card. Low tier bus 410 is also capable of supporting packet based traffic.

Low tier bus 410 utilizes GTLP drivers that are pulled up on backplane 210. The abbreviation GTLP stands for "GTL+" or "gunning transistor logic plus." Low tier bus 410 is referenced to one half of the fundamental 65.536 MHz backplane clock. Therefore, low tier bus 410 operates at a nominal clock rate of 32.768 MHz. Two phases of the 65.536 MHz clock bus are provided by primary and secondary timing masters to accommodate the timing requirements of low tier bus 410. Backplane 210 provides full redundancy of low tier bus 410 in the form of two complete sets of data/control signals. A redundant clock reference for low tier bus 410 is also provided.

The high tier of backplane 210 comprises high tier bus 415 and switch matrix cards, 260 and 270. High tier bus 415 supports aggregate traffic rates of up to approximately twenty gigabits per second (20 Gbps). High tier bus 415 uses redundant high speed serial links in conjunction with dedicated switch matrix cards, 260 and 270.

High speed serial links provide high capacity transport of user and control traffic between the appropriate card types (e.g., OC-3N) and switch matrix cards, 260 and 270. The high speed serial links are point-to-point serial links comprising differential pairs for both a transmit path and a receive path. Traffic on the high speed serial links terminates at switch matrix card 260 (or switch matrix card 270) where uniform length traffic is switched to an appropriate backplane card slot in accordance with the information contained within each cell's header.

The high speed serial links are differential low voltage positive emitter coupled logic (LVPECL) levels that are driven from source to destination and are terminated on the receiving end of links. The links are referenced to the 65.536 MHz clock reference that is provided by primary and secondary master timing interface control processor (ICP) cards. This clock rate is multiplied by twenty (20) by the high speed serial link serial/de-serial devices (SERDES devices) to provide a baud rate of 1.31072 MHz. Because each link is 8B/10B encoded, the corresponding transmission rate is approximately 1.05 Gbps. In another advantageous embodiment of the present invention, the transmission rate is approximately 2.5 Gbps.

The high speed serial links are redundant in that there is a minimum of two (2) links per ICP slot. One transmit/receive pair terminates at switch matrix card 260 (on the A side) and the other transmit/receive pair terminates at switch matrix card 270 (on the B side).

The data transmitted by the high speed serial links are 8B/10B encoded, but no parity checks are made at the physical (PHY) level. However, any data traffic sent across the high speed serial links will be CRC checked (cyclic redundancy checked) across the cell/packet level. Consequently, the integrity of each high speed serial link is verified with each cell/packet transfer. Because each high speed serial link is a point-to-point topology, no fault isolation is necessary.

As shown in FIG. 4, interface control processor cards, 230 and 240, are coupled to and communicate with both low tier bus 410 and high tier bus 415. Interface control processor card 230 comprises data shaping and grooming unit 435 and line interface 440. Similarly, interface control processor card 240 comprises data shaping and grooming unit 450 and line interface 455. Interface control processor cards, 230 and 240, also are coupled to and communicate with switch matrix card 260 and with switch matrix card 270. Signal processing cards/auxiliary processing cards, 460, 465 and 470, are coupled to and communicate with low tier bus 410 and with high tier bus 415.

The two-tiered traffic and switching architecture of the backplane of the present invention has been described with reference to backplane 210 within access processor shelf 170. However, the same two-tiered traffic and switching architecture of the present invention is utilized in backplane 210 within remote modem shelf 140. In addition, the two-tiered traffic and switching architecture of the backplane of the present invention may also be utilized within a backplane 210 within a unit that combines the functions of access processor shelf 170 and remote modem 140.

Other advantageous embodiments of backplane 210 within access processor shelf 170 and other advantageous embodiments of backplane 210 within remote modem shelf 140 (and other advantageous embodiments of backplane 210 within a unit that combines the functions of access processor shelf 170 and remote modem shelf 140) comprise additional bus structures.

For example, an additional advantageous embodiment of backplane 210 may comprise (in addition to low tier bus 410 and high tier bus 415) a time division multiplex (TDM) bus, a communications bus, a common control bus, a Joint Test Access Group (JTAG) test bus, and clocks and framing resources.

A time division multiplex (TDM) bus provides a resource that is especially suitable for interfacing with legacy circuit-switched network interfaces. A time division multiplex (TDM) bus comprises thirty two (32) independent serialized buses, each of which carries voice or data traffic, channelized into a DS0 format. A TDM bus provides a switch fabric across backplane 210 by (1) allowing any TDM-equipped card on the input side of the connection to transmit within specified time slots, and by (2) allowing any TDM-equipped card on the output side of the connection to receive the data within the corresponding time slots.

An exemplary TDM bus within backplane 210 utilizes GTLP drivers that are pulled up on backplane 210. Each TDM bus is designed to operate at a rate of either 8.192 Mbps or 16.384 Mbps. When all cards within backplane 210 are operating at the rate of 8.192 Mbps, then two thousand forty eight (2,048) full duplex DS0 channels are supported by the TDM bus. When all cards within backplane 210 are operating at the rate of 16.384 Mbps, then four thousand ninety six (4,096) full duplex DS0 channels are supported by the TDM bus. The TDM bus is also capable of simultaneously operating with a mix of cards where some cards operate at 8.192 Mbps and where some cards operate at 16.384 Mbps.

Each of the thirty two (32) serial buses that make up the TDM bus operates independently of the remaining serial buses. Consequently, if one of the thirty two (32) serial buses fails (e.g., due to a component failure with an ICP card) it is possible (depending upon the type of failure) that the remaining thirty one (31) serial buses of the TDM bus will not be affected. However, to assure full redundancy, a second TDM bus with a second set of thirty two (32) serial buses is provided. The second TDM bus can either be operated in standby mode for full redundancy, or operated in active mode to double the TDM bus capacity on backplane 210.

A communications bus comprises a serial bus that supports general communications between circuit board cards of backplane 210. A communications bus also supports specialized communications for system redundancy purposes. Communications bus of backplane 210 is a backplane version of the IEEE-1394 serial bus standard. The communications bus on backplane 210 utilizes GTLP drivers that are pulled up on backplane 210. The communications bus is referenced to 100 MHz local oscillators located on each card within backplane 210.

A common control bus is a serial bus that supports control and maintenance functions. The control and maintenance functions supported by a control bus include: (1) periodic alarm and maintenance scanning of each card slot, and (2) validation of card type and revision level prior to bringing a card into service, and (3) reset control of each card slot. An advantageous embodiment of a common control bus utilizes the I²C protocol described in "The I²C Bus Specification" published by Philips Semiconductor. The term "I²C Bus" is an abbreviation of "Inter Integrated Circuit Bus."

The common control bus within backplane 210 utilizes GTLP drivers that are pulled up on backplane 210. The common control bus operates in a multi-master mode and is self-clocked by the master controller. Backplane 210 provides full redundancy for the common control bus in the form of two (2) complete sets of data/control signals.

The common control bus within backplane 210 has no inherent facilities for detecting the occurrence of a failure (e.g., that a bus is held "low"). Therefore, a means for detecting failures on the common control bus is required. One possible method for testing the integrity of the common control bus is to periodically read data from a well known address space (e.g., the EEPROM for backplane 210).

A Joint Test Access Group (JTAG) test bus is a bused version of the IEEE 1149 standard. A JTAG test bus is used to provide a card-level test interface for each card slot. Each card in access processor shelf 170 (and each card in remote modem shelf 140) incorporates an IEEE 1149 transceiver that isolates each card until the address that corresponds to the card slot is received from an IEEE 1149 test master.

The JTAG test bus within backplane 210 uses standard transistor transistor logic (TTL) levels, which (except for the return data path) are driven by an IEEE 1149 bus master. The operation of the JTAG test bus of backplane 210 assumes that the IEEE 1149 bus master is an external device. All clocking and messaging of the JTAG test bus are controlled by the external tester.

Clocks and framing resources of backplane 210 provide the timing for the synchronous time division multiplex (TDM) resources. The timing signals consist of (1) a 65.536 MHz clock signal referenced to a network qualified source, and (2) an eight kilohertz (8 kHz) frame signal that is phase locked to the 65.536 MHz clock signal. The 65.536 MHz clock is also utilized as reference timing for low tier bus 410 (CellBus™ ) and for high tier bus 415 (high speed serial links). This allows the derivation of clocks synchronous with the network. The clock signals are differential signals transmitted from the primary (and secondary) timing masters to remaining card slots.

Separate sets of clock and framing resources are provided on backplane 210. The first set of clock and framing resources is driven by a primary master interface control processor (ICP) card. The second set of clock and framing resources is driven by a secondary master interface control processor (ICP) card. Under normal operation, the two clocks should be derived (as directed by software control) from the same reference source. Consequently, the two sets of clock and framing resources are phase locked. This allows individual interface control processor (ICP) cards to switch traffic between the two TDM buses in an error free manner.

Each card contains circuitry for detecting a missing clock signal in order to allow an error free switchover to a redundant set of clock and framing resources.

The bus structures described above may be incorporated into a backplane architecture within access processor shelf 170, or within remote modem shelf 140, or within a unit that combines the functions of access processor shelf 170 and remote modem shelf 140.

Figure 5:
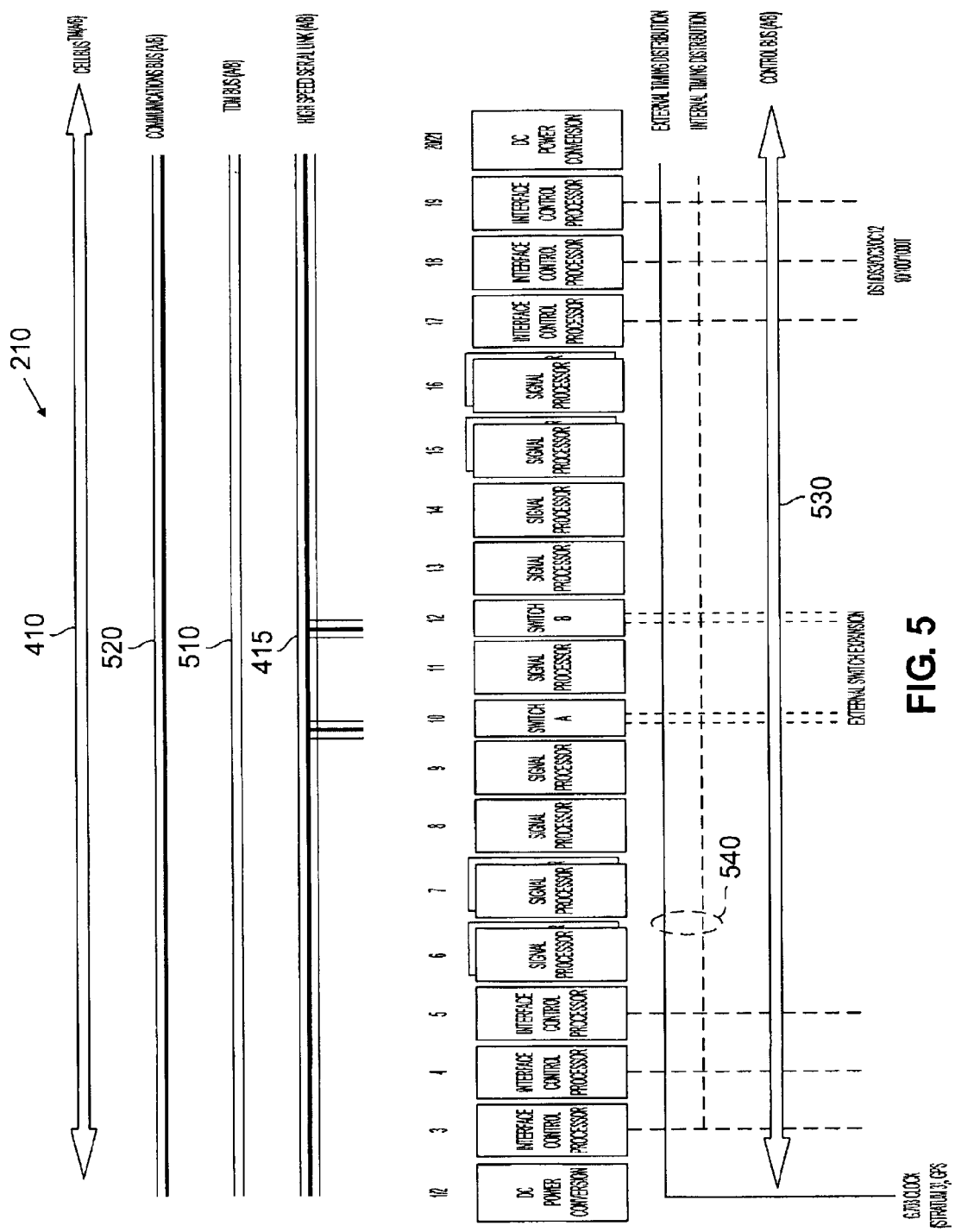
FIG. 5 illustrates a block diagram of one advantageous embodiment of an exemplary backplane in which line replaceable units may be inserted on-line in accordance with the principles of the present invention showing the interconnection of the backplane with circuit board cards of an access processor shelf.

FIG. 5 illustrates exemplary backplane 210 within access processor shelf 170 comprising low tier bus 410 (CellBus™), high tier bus 415 (high speed serial link), time division multiplex (TDM) bus 510, communications bus 520, common control bus 530, and clocks and framing resources 540. The designation (A/B) signifies that each bus is a dual bus with a first A side and a second B side. FIG. 5 illustrates an exemplary access processor shelf 170 in which all twenty one (21) card slots are fully populated. Each of the individual circuit board cards within the twenty one (21) card slots are capable of accessing each of the buses on backplane 210 (including buses on backplane 210 not shown in FIG. 5).

Figure 6:
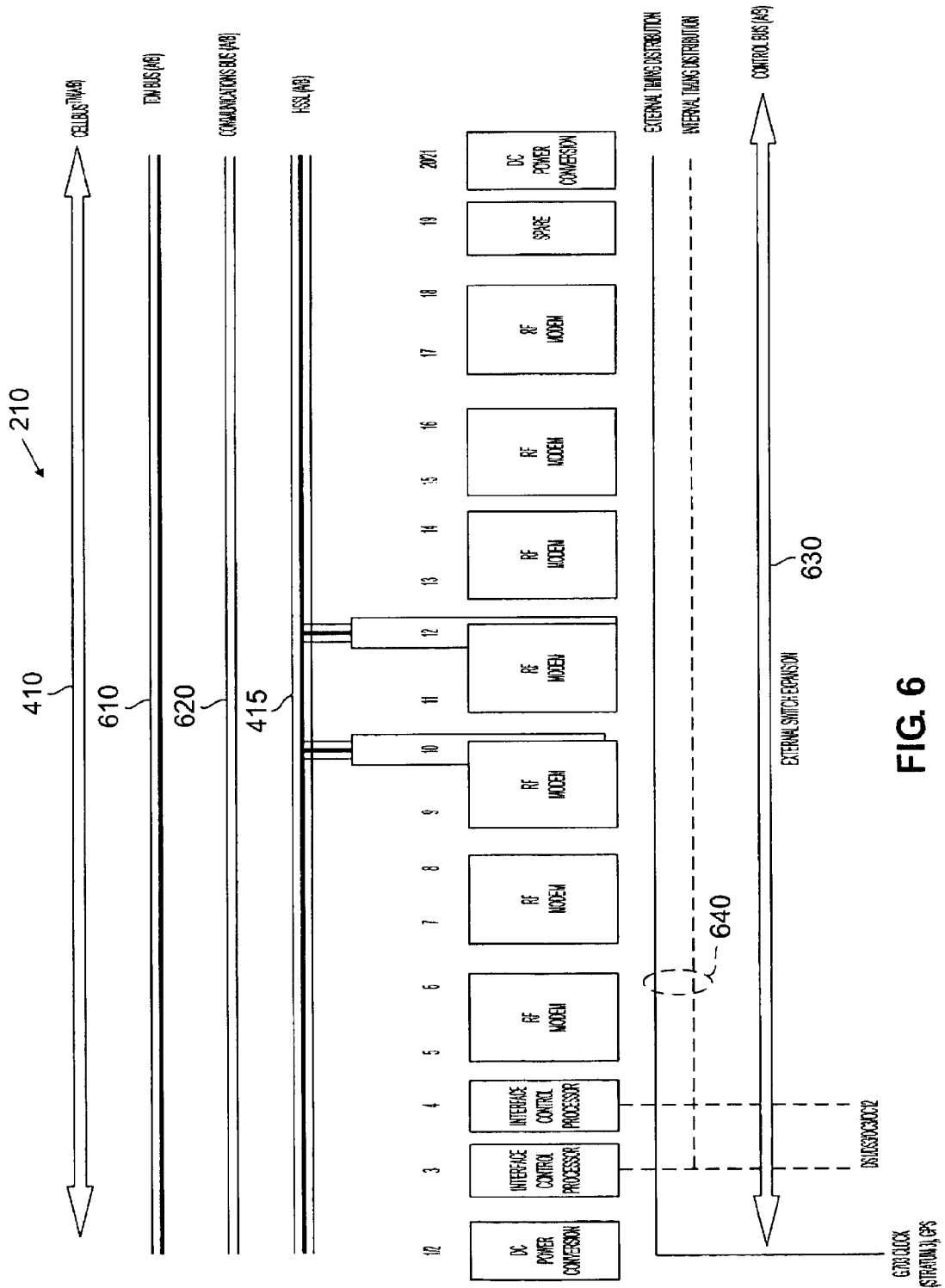
FIG. 6 illustrates a block diagram of one advantageous embodiment of an exemplary backplane in which line replaceable units may be inserted on-line in accordance with the principles of the present invention showing the interconnection of the backplane with circuit board cards of a remote modem shelf.

FIG. 6 illustrates exemplary backplane 210 within remote modem shelf 140 comprising low tier bus 410 (CellBus™), high tier bus 415 (high speed serial link), time division multiplex (TDM) bus 610, communications bus 620, common control bus 630, and clocks and framing resources 640. The designation (A/B) signifies that each bus is a dual bus with a first A side and a second B side. FIG. 6 illustrates an exemplary remote modem shelf 140 in which all twenty one (21) card slots are fully populated. Each of the individual circuit board cards within the twenty one (21) card slots are capable of accessing each of the buses on backplane 210 (including buses on backplane 210 not shown in FIG. 6).

Figure 7:
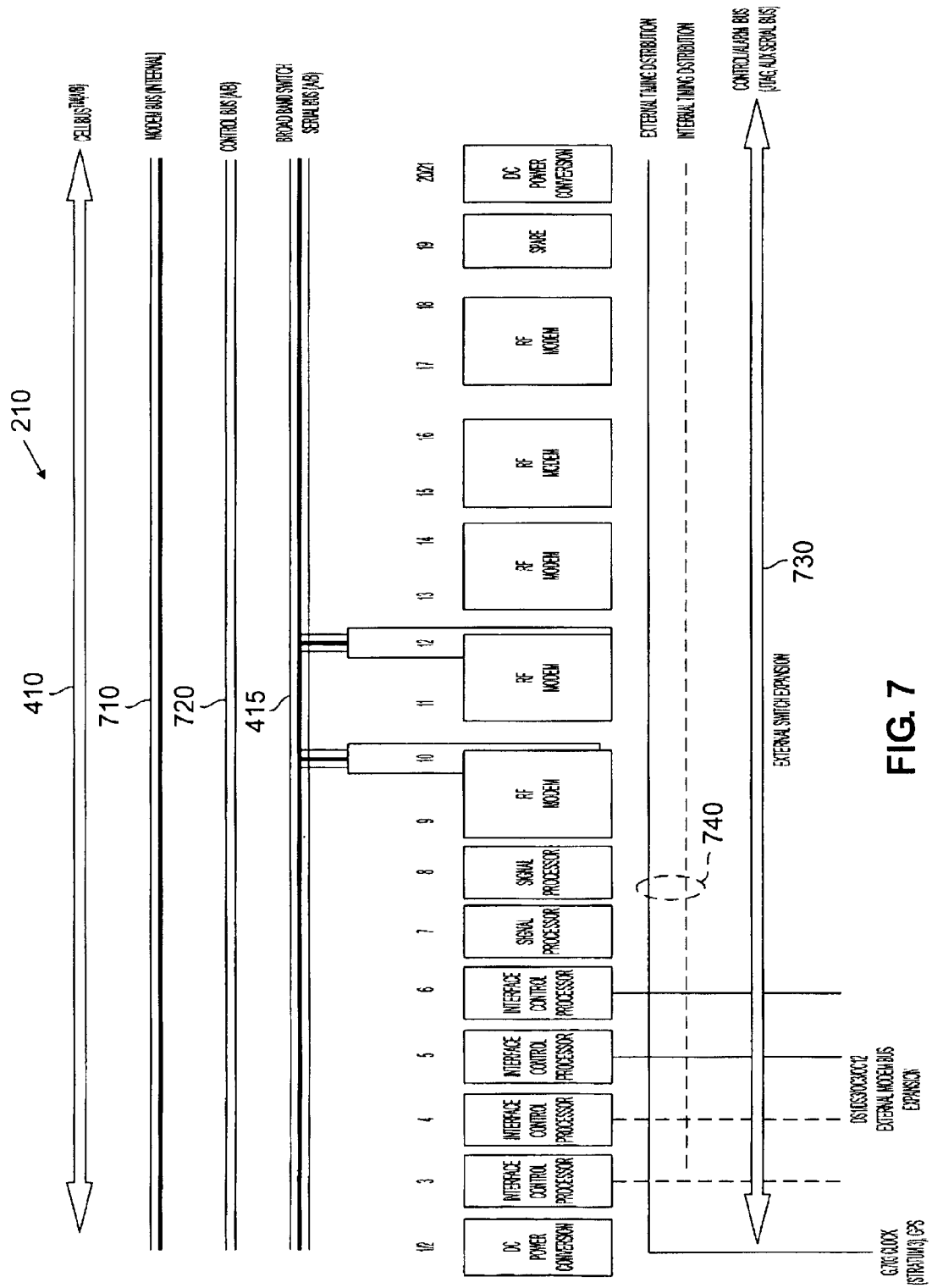
FIG. 7 illustrates a block diagram of one advantageous embodiment of an exemplary backplane in which line replaceable units may be inserted on-line in accordance with the principles of the present invention showing the interconnection of the backplane with circuit board cards of a unit that combines the functions of an access processor shelf and a remote modem shelf.

FIG. 7 illustrates exemplary backplane 210 within a unit combining the functions of access processor shelf 170 and remote modem shelf 140 comprising low tier bus 410 (CellBus™), high tier bus 415 (broad band switch serial bus), modem bus 710, control bus 720, control/alarm bus 730 (including JTAG bus), and clocks and framing resources 740. The designation (A/B) signifies that each bus is a dual bus with a first A side and a second B side. Each of the individual circuit board cards within the twenty one (21) card slots are capable of accessing each of the buses on backplane 210 (including buses on backplane 210 not shown in FIG. 7).

Whether located in access processor shelf 170, or whether located in remote modem shelf 140, or whether located in a unit combining the functions of access processor shelf 170 and remote modem shelf 140, backplane 210 supports "hot swap" or on-line replacement of line replaceable units. A common type of line replaceable unit is a circuit board card. Therefore, line replaceable units will be depicted as circuit board cards in the description that follows. For convenience, the circuit board cards will be referred to as "cards".

The method of the present invention for the on-line insertion of cards will be described for cards inserted in backplane 210 of access processor shelf 170. The method, however, is generally applicable to cards within any similarly configured backplane 210 in other types of equipment.

Placing a card into backplane 210 with an on-line insertion involves inserting the card into a location within backplane 210 while backplane 210 is fully powered.

Replacing a card within backplane 210 using a "hot swap" (or on-line removal and insertion) involves (1) removing the card from a location in backplane 210 while backplane 210 is fully powered, and (2) inserting a replacement card into the location of backplane 210 formerly occupied by the original card while backplane 210 is fully powered.

The system and method of the present invention does not employ a separate "common control card" within backplane 210 for regulating the on-line insertion of cards, or for configuring cards that have been newly inserted within backplane 210. Instead, the system and method of the present invention employs a concept of "distributed control" in which the necessary functions are shared by more than one card within backplane 210.

As will be more fully described, the system and method of the present invention employs an interface control processor card (ICP) within backplane 210 (e.g., ICP 230) as a primary master controller. Primary master controller 230 comprises a microprocessor and associated circuitry for communicating with other cards within backplane 210 of access processor 170. That is, primary master controller 230 is capable of sending signals to and receiving signals from the other cards within backplane 210 on common control bus 530 (I²C Bus).

The system and method of the present invention comprises a power control circuit (not shown) for distributing power across backplane 210 through a common set of voltage rails (not shown). The voltage rails distribute regulated voltages from both an "A side" power supply unit (e.g., card 220) and a "B side" power supply unit (e.g., card 280). Each voltage is diode coupled at the final output stage for redundancy across backplane 210. These outputs are compensated at the power supply prior to the diode-coupled output stage to provide the voltages of one and one half volts (+1.5 V), three and three tenths volts (+3.3 V), five volts (+5.0 V), and twelve volts (+12.0 V).

The power control circuit is capable of providing a first level of power to the cards in backplane 210 that are not fully operational. The power control circuit is also capable of providing a second level of power to the cards in backplane 210 that are fully operational.

When a new card is inserted into a slot in backplane 210 (1) the new card does not automatically have access to the other buses of backplane 210, and (2) the new card does not automatically have access to full operational power. The new card remains isolated until it has been checked and approved by primary master controller 230.

Primary master controller 230 periodically sends a "heart beat" signal to interrogate each card within backplane 210 to determine the operational status of each card. The period of the "heart beat" signal is typically less than one (1) second. When primary master controller 230 detects a newly inserted card, then primary master controller 230 will not allow the new card full access to the buses of backplane 210 until primary master controller 230 has determined that the new card has been appropriately configured and is ready for operation. Primary master controller 230 queries an EEPROM in the new card to determine whether the new card is capable of operating in access processor shelf 170. If the new card is operationally capable, primary master controller 230 uses common control bus 530 (I²C Bus) to set a "Power On" bit in a Card Control Register (CCR) of the new card. This turns on full operational power to the new card.

A microprocessor (not shown) in the new card then performs a Power On Self Test (POST). The microprocessor (1) loads up software from an electrically erasable programming read only memory (EEPROM), (2) performs a memory test, (3) loads up a field programmable gate array, and (4) evaluates the status of subsystems on the new card. After completing the POST process, the new card then enables a limited communication channel to primary master controller 230. Primary master controller 230 then determines whether the new card has the latest version of operating software. If the new card needs a software update (or a software update to the software portion of firmware), then primary master controller 230 will download the appropriate software update to the new card. Primary master controller 230 will then reboot the new card to incorporate the new software. If necessary, primary master controller 230 will also synchronize the clock signal of the new card.

After primary master controller 230 determines that the new card is ready, then primary master controller 230 allows the new card to have access to the buses of backplane 210. That is, until a card is properly configured and ready for operation, the card will remain isolated from all operations buses, all traffic busses, and all control buses (other than common control bus 530). To activate the operational status of the new card, primary master controller 230 sets a "Card Enable" bit in the Card Control Register (CCR) of the new card.

If a card does not respond properly to a "heart beat" signal (i.e., a status inquiry signal) from primary master controller 230, then primary master controller 230 may remove the card from service. To do this, uses common control bus 530 (I²C Bus) to clear the "Power On" bit in the Card Control Register (CCR) of the card in question. This disables power to all but the common control power sections of the card. This "card disabled" state can only be cleared by either removing the card from the access processor shelf 170, or by power cycling the access processor shelf 170. This is done so that the card will not be constantly cycling on and off.

The system and method of the present invention also employs an interface control processor card (ICP) within backplane 210 (e.g., ICP 240) as a secondary master controller. Like primary master controller 230, secondary master controller 240 also comprises a microprocessor and associated circuitry for communicating with other cards within backplane 210 of access processor 170. Secondary master controller 240 provides a backup master controller to carry out the functions of primary master controller 230 if primary master controller 230 fails.

In an advantageous embodiment of the present invention, primary master controller 230 is assigned a specific slot in access processor shelf 170 (e.g., slot 3) and secondary master controller 240 is also assigned a specific slot in access processor shelf 170 (e.g., slot 4). As a part of the common control for the cards within access processor shelf 170, backplane 210 provides five (5) pins that indicate the slot address in backplane 210. In this advantageous embodiment of the present invention, primary master controller 230 is therefore capable of determining the identity of the slot of access processor shelf 170 in which primary master controller 230 is located. Similarly, secondary master controller 240 is capable of determining the identity of the slot of access processor shelf 170 in which secondary master controller 240 is located.

When access processor shelf 170 powers up, primary master controller 230 automatically powers up and performs a Power On Self Test (POST). Following the POST, primary master controller 230 then assumes control of access processor shelf 170 and provides all timing and control functions.

Secondary master controller 240 also automatically powers up and performs a Power On Self Test (POST). However, in order to give primarymaster controller 230 time to complete is POST first (and assume control of access processor shelf 170), secondary master controller 240 initiates a delay before it begins its POST. After secondary master controller 240 completes its POST, secondary master controller 240 communicates with primary master controller 230 in order to determine if primary master controller 230 is functioning. If primary master controller is not functioning, then secondary master controller 240 assumes control of access processor shelf 170. If primary master controller 230 is functioning, then secondary master controller 240 enters a "stand by" or "wait" state. Secondary master controller 240 will take over control of access processor shelf 170 if primary master controller 230 fails.

Primary master controller 230 communicates with secondary master controller 240 in order to determine if secondary master controller 240 is functioning. If secondary master controller 240 has not successfully powered up or is not functioning, then primary master controller 230 generates and sends a "No Spare Master" alarm signal to the element management system (EMS). Similarly, if primary master controller 230 has not successfully powered up or is not functioning, then secondary master controller 240 generates and sends a "No Spare Master" alarm signal to the element management system (EMS).

In this manner, the system and method of the present invention provides an automated procedure for determining which master controller (either primary master controller 230 or secondary master controller 240) will control access processor shelf 170. The system and method of the present invention also provides an automated procedure for replacing primary master controller 230 with secondary master controller 240 in the event that primary master controller 230 fails.

The system and method of the present invention provides a procedure by which cards may be inserted "on line" into backplane 210 while backplane 210 is fully powered. As described above, a newly inserted card is not permitted full access to the resources of backplane 210 until the new card has been configured and authorized by primary master controller 230.

As also described above, the regulation of the "on line" insertion of cards is accomplished using "distributed control" in which more than one card is capable of configuring and authorizing the new card before the new card is activated.

Figure 8:
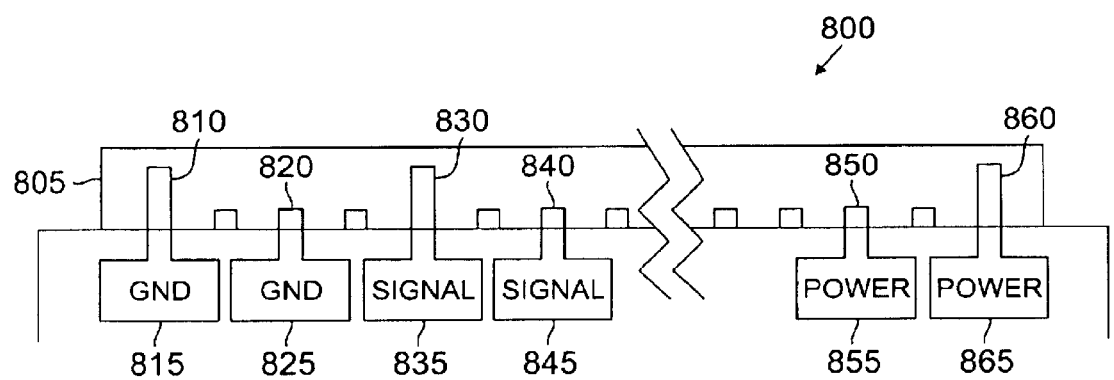
FIG. 8 illustrates an edge of an exemplary on-line replaceable circuit board card having both long and short ground pins, long and short power pins, and long and short signal line pins for insertion into a backplane.

FIG. 8 illustrates an edge portion of an exemplary circuit board card 800 capable of being used with the system and method of the present invention. Card 800 may be removed from backplane 210 or inserted within backplane 210 without adversely affecting the signal integrity of any bused signal that card 800 touches. Card 800 has circuitry for properly sequencing the application of various voltages onto card 800 and for monitoring the proper power regulation on card 800.

As shown in FIG. 8, the edge 805 of card 800 possesses both long connector pins (e.g., 810, 830, 860) and short connector pins (e.g., 820, 840, 850). When card 800 is inserted into backplane 210, the long pins on edge 805 of card 800 make contact with their respective locations on backplane 210 before the short pins do. For example, long connector pin 810 is a "long ground" pin that provides an initial card grounding for ground 815 during insertion. Short connector pin 820 is a "short ground" pin that provides additional grounding for ground 825 after card 800 has been fully inserted. Other "short ground" pins (not shown) are also interspersed with selected high speed signals to minimize coupled between adjacent signal pins.

Long connector pin 860 is a "long power" pin that provides an initial power level to bring up power monitoring circuits and to provide pre-charge voltages for bus interface circuits (represented in block 865). Short connector pin 850 is a "short power" pin that provides power to the backend 855 of card 800 when card 800 is fully inserted and powered.

Long connector pin 830 is a "long signal" pin that provides an early signal to card 800 at location 835 for sending control signals to the power monitoring circuits. Short connector pin 840 is a "short signal" pin that provides a normal signal connection to card 800 at location 845 when card 800 is fully inserted.

Figure 9:
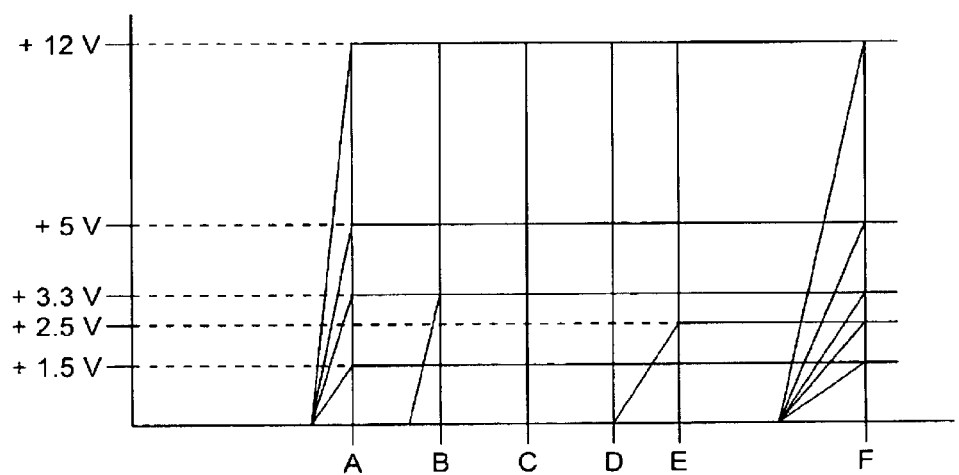
FIG. 9 illustrates a diagram showing voltage versus time when an on-line replaceable circuit board card is powered up.

When card 800 is inserted into backplane 210, card 800 powers up. The power ramp for the voltages on card 800 are done in a controlled manner as shown in FIG. 9. The diagram in FIG. 9 shows the power ramp of values of voltage versus time. First, power is applied to card 800 either by a system "power on" or by an "on line" card insertion. The power rises to the voltage levels shown at Point A ("Backplane Power"). The backplane power levels are one and one half volts (+1.5 V), three and three tenths volts (+3.3 V), five volts (+5.0 V), and twelve (+12.0 V). It is understood that these particular voltages are representative examples and that other voltages could also be used.

After the three and three tenths volts (+3.3 V) backplane power is established, primary master controller 230 can access an EEPROM in card 800 using common control bus 530 ($I^2C$ Bus). Control power is ramped up to the three and three tenths volts (+3.3 V) level at point B ("Control Power"). Primary master controller 230 interrogates card 800 at point C ("Interrogation by Primary Master Controller"). If primary master controller 230 enables card 800, primary master controller 230 enables the "Card Enable" bit in the Card Control Register (CCR) of card 800. This occurs at Point D ("Card Enabled"). The local regulators are then ramped up to a voltage level of two and one half volts (+2.5 V). This occurs at Point E ("Local Regulators"). Following a delay to wait for the local regulators to stabilize, all power to card 800 is ramped up to normal voltages. This occurs at Point F ("Full Power"). Voltage ramping is simultaneous to prevent CMOS latch-up. If any card voltage rail fails, then all voltage rails will be shut down. The Card Status Register (CSR) of card 800 will then save the fault condition associated with the failure.

Figure 10:
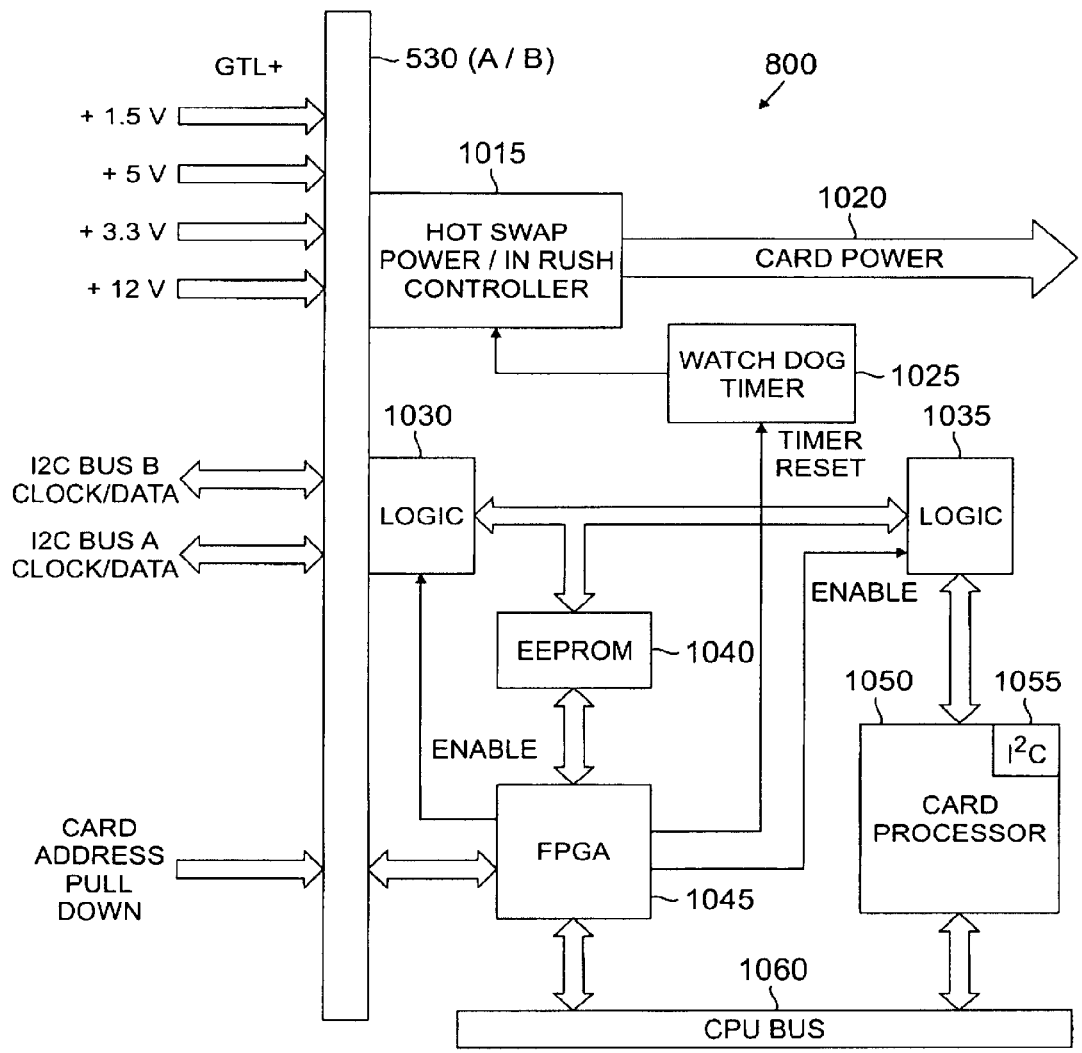
FIG. 10 illustrates a circuit diagram of a portion of an on-line replaceable circuit board card and its connection to a common control bus in accordance with the principles of the present invention.

FIG. 10 illustrates a circuit diagram of a portion of card 800 and its connection to common control bus 530 ($I^2C$ Bus) in accordance with the principles of the present invention. Common control bus 530 comprises dual two (2) wire serial buses, Bus A and Bus B. Bus A is the default bus. Bus B is used as a secondary communications link when Bus A fails.

The portion of card 800 shown in FIG. 10 comprises "hot swap" power/in rush controller 1015 for regulating card power 1020, watch dog timer 1025, logic unit 1030, logic unit 1035, EEPROM 1040, field programmable gate array (FPGA) 1045, card processor 1050 having an $I^2C$ portion 1055 for interfacing with common control bus 530 (I²C Bus). FPGA 1045 and card processor 1050 are coupled to central processing unit (CPU) bus 1060.

Common control bus 530 receives GTL (gunning transistor logic) voltage levels at one and one half volts (+1.5 V), three and three tenths volts (+3.3 V), five volts (+5.0 V), and twelve volts (+12 V). When card 800 is inserted into backplane 210, "hot swap" power/in rush controller 1015 ramps up the power to card 800 in the manner previously described and resets watch dog timer 1025. Thereafter, watch dog timer 1025 will automatically signal "hot swap" power/in rush controller 1015 to shut down card power 1020 to card 800 if watch dog timer 1025 does not periodically receive a reset signal within a specified period of time.

Card processor 1050 then boots up. Card processor 1050 then loads up software from EEPROM 1040 and performs a memory test. Card processor 1050 then loads up field programmable gate array (FPGA) 1045. Card processor 1050 then performs a Power On Self Test (POST). Card processor 1050 then uses I²C portion 1055 to activate the connection to common control bus 530 (I²C Bus).

Card processor 1050 of card 800 then seeks to determine whether card 800 is a master controller card (either primary or secondary) or whether card 800 is a non-master controller card. Card processor 1050 accesses the five (5) pins in backplane 210 that indicate the slot address. In this manner card processor 1050 can determine the identity of the slot in which card 800 is located. For example, if card 800 is located in Slot 3, then card processor 1050 identifies card 800 as primary master controller 230.

One difficulty with common control bus 530 (I²C Bus) is that it is limited to seven (7) address bits. Four (4) bits have been reserved to identify a device type. This leaves only three (3) bits (or eight (8) locations) to uniquely identify devices. The system and method of the present invention requires access to more than sixteen (16) card slots. In order to be able to access more than eight (8) locations, the system and method of the present invention provides an extension to common control bus 530. The system and method of the extension to common control bus 530 will now be discussed.

Figure 11:
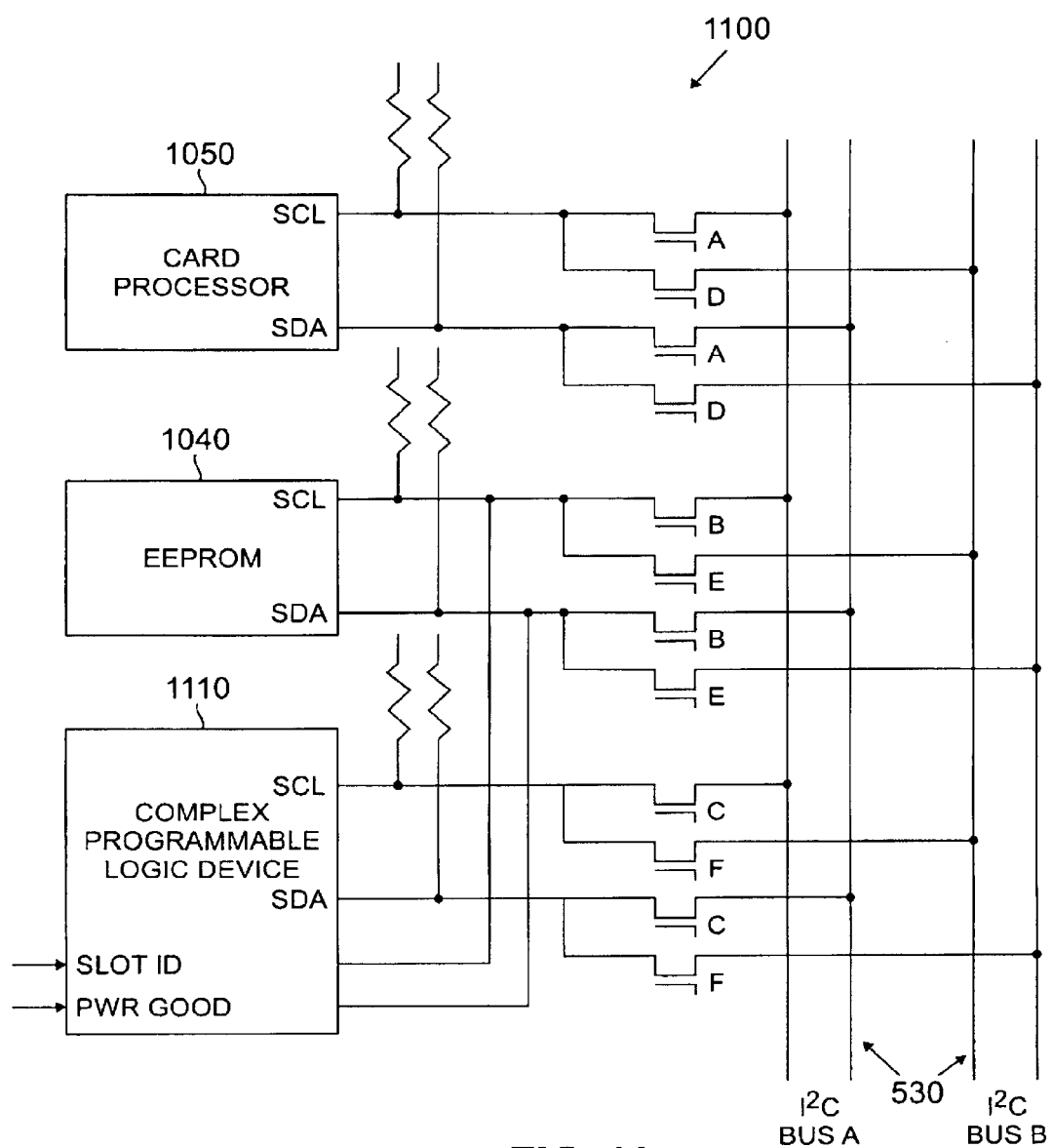
FIG. 11 illustrates a circuit diagram showing in more detail the connection of certain elements of the on-line replaceable circuit board card to the common control bus shown in FIG. 10.

FIG. 11 illustrates circuit diagram 1100 showing the connection of certain elements of card 800 to common control bus 530. Common control bus 530 (I²C Bus) is a dual two (2) wire serial interface used to connect several devices with a minimum number of connections. Each device on common control bus 530 is connected with a serial clock line (SCL) connection and a serial data line (SDA) connection. A master controller connected to common control bus 530 always drives the serial clock line (SCL). More than one master controller can exist on common control bus 530. A collision detection device (not shown) is used prevent more than one master controllers from using the bus at the same time. The serial data lines (SDA) are bidirectional data lines. An SDA line is first driven by a master controller to send control and address information to the controlled unit. Then if a read operation is requested, the controlled unit drives the data onto the common control bus 530.

FIG. 11 shows how devices connected to common control bus 530 are wired to the dual buses (A and B) of common control bus 530 on backplane 210. Illustrated in FIG. 11 are card processor 1050, EEPROM 1040, and complex programmable logic device (CPLD) 1110. CPLD 1110 may be located in logic unit 1030 (or logic unit 1035). Card processor 1050 is isolated from common control bus 530 by MOSFET switches (switches "A" for Bus A and switches "D" for Bus B). EEPROM 1040 is similarly isolated from common control bus S530 by MOSFET switches (switches "B" for Bus A and switches "E" for Bus B). CPLD 1110 is also similarly isolated from common control bus 530 by MOSFET switches (switches "C" for Bus A and switches "F" for Bus B). The MOSFET switches are off during the "power up" process and are only turned on after CPLD 1110 determines that card 800 has been fully powered.

After CPLD 1110 determines that card 800 has been fully powered, CPLD 1110 connects itself to backplane 210 and allows other cards to interrogate the Card Status Register (CSR) inside of CPLD 1110. CPLD 1110 acts as a gateway to EEPROM 1040. CPLD 1110 monitors the address field of a computer instruction. If the addressed device is EEPROM 1040, then CPLD 1110 will generate a start condition to EEPROM 1040 and connect EEPROM 1040 to common control bus 530. The transaction with EEPROM 1040 then continues as if EEPROM 1040 were connected directly to backplane 210.

Figure 12:
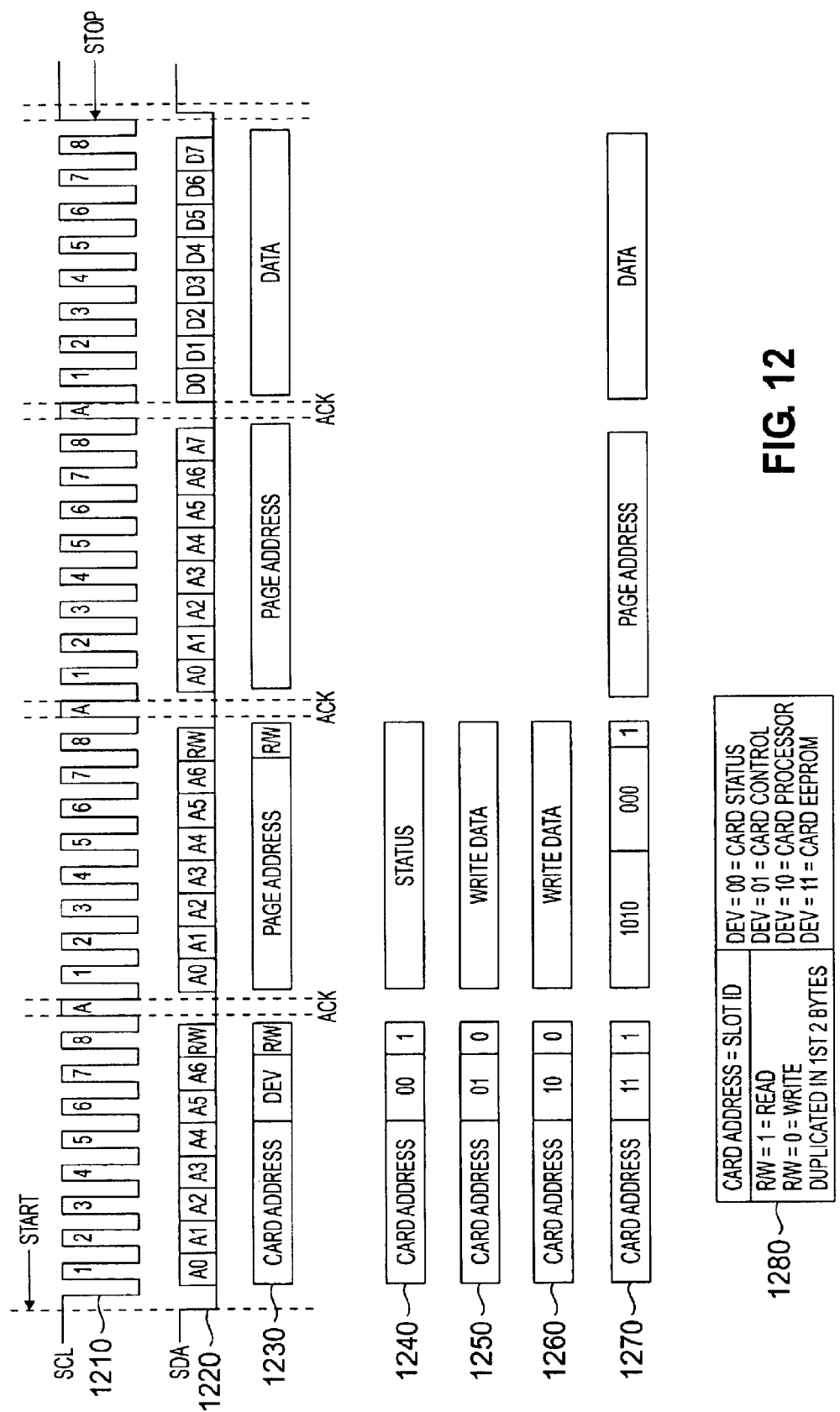
FIG. 12 illustrates a diagram showing examples of read operations and write operations to certain devices in accordance with the principles of the present invention.

FIG. 12 illustrates examples of read and write transactions accessing some of the elements of card 800. The clock signal on the serial clock line (SCL) is denoted with reference numeral 1210. The data on the serial data line (SDA) is denoted with reference numeral 1220. A block of eight (8) clock cycles on the SCL line is followed by one (1) acknowledgment cycle (denoted in FIG. 12 with the letter "A" or the letters "ACK"). The acknowledgment cycle (ACK) separates each eight (8) bit byte of data on the SDA line.

As shown in FIG. 12, the content of the first four bytes are denoted with reference numeral 1230. Bits A0 to A6 of the first byte contain the card address. The card address is the slot identification number (SLOT ID). Bits A5 and A6 of the first byte contain the device code (DEV). Bit R/W of the first byte contains an instruction to either read or write. A value of one (1) for the R/W bit gives a "read" instruction. A value of zero (0) for the R/W bit give a "write" instruction.

As shown in table 1280 in FIG. 12, device code "zero zero" (00) denotes the Card Status Register (CSR). Device code "zero one" (01) denotes the Card Control Register (CCR). Device code "one zero" (10) denotes card processor 1050. Device code "one one" (11) denotes EEPROM 1040.

Bits A0 to A6 of the second byte contain a page address. Bit R/W of the second byte contains an instruction to either read or write. Bits A0 to A7 of the third byte contains a page address. Bits D0 to D7 of the fourth byte contains data.

Example Number One (denoted with reference numeral 1240) illustrates an operation to read the Card Status Register (CSR) in CPLD 1110. This operation requires only a card address (i.e., the SLOT ID), the two bit device code of "zero zero" to access the Card Status Register (CSR), and the R/W bit set to "one" to read the Card Status Register. CPLD 1110 returns the values in the Card Status Register in the second byte. Therefore, only the first two bytes are needed for this read operation.

Example Number Two (denoted with reference numeral 1250) illustrates an operation to write to the Card Control Register (CCR). This operation requires only a card address (i.e., the SLOT ID), the two bit device code of "zero one" to access the Card Control Register (CCR), and the R/W bit set to "zero" to write to the Card Control Register. The data to be written is located in the second byte and is provided by the master controller on common control bus 530. Only the first two bytes are needed for this write operation.

Example Number Three (denoted by reference numeral 1260) illustrates an operation to write to card processor 1050 on card 800. This operation requires only a card address (i.e., the SLOT ID), the two bit device code of "one zero" to access card processor 1050, and the R/W bit set to "zero" to write to the card processor. The data to be written is located in the second byte and is provided by the master controller on common control bus 530. Only the first two bytes are needed for this write operation. Because the I²C bus address in card processor 1050 is fully programmable, card processor 1050 can directly respond to the card address and the device type. This operation therefore continues independently of CPLD 1110 and EEPROM 1040.

Example Number Four (denoted by reference numeral 1270) illustrates an operation to read EEPROM 1040. This operation requires a card address (i.e., the SLOT ID), the two bit device code of "one one" to access EEPROM 1040, and the R/W bit set to "one" to read from EEPROM 1040. These inputs are in the first byte. CPLD 1110 always monitors the first byte to determine whether it is accessing EEPROM 1040. If the first byte is accessing EEPROM 1040, then CPLD 1110 creates a start condition on the pins of EEPROM 1040 and then connects EEPROM to common control bus 530 of backplane 210. Access to EEPROM 1040 then continues normally.

Bits A0 to A3 of the second byte contain the EEPROM device code of "one zero one zero" (1010). Bits A4 to A6 of the second byte contain a three bit programmable address code "zero zero zero" (000). Normally, only one device will be present and the three bits A4 to A6 will each be zero. The R/W bit in the second byte is set to "one" (1) for a read operation.

Bits A0 to A7 of the third byte contain the page address with EEPROM 1040. The write data is in the fourth byte. Therefore, all four bytes are needed for this write operation.

In this manner, the system and method of the present invention provides an extension to common control bus 530 (I²C bus) so that more than eight (8) slots can be accessed.

Figure 13:
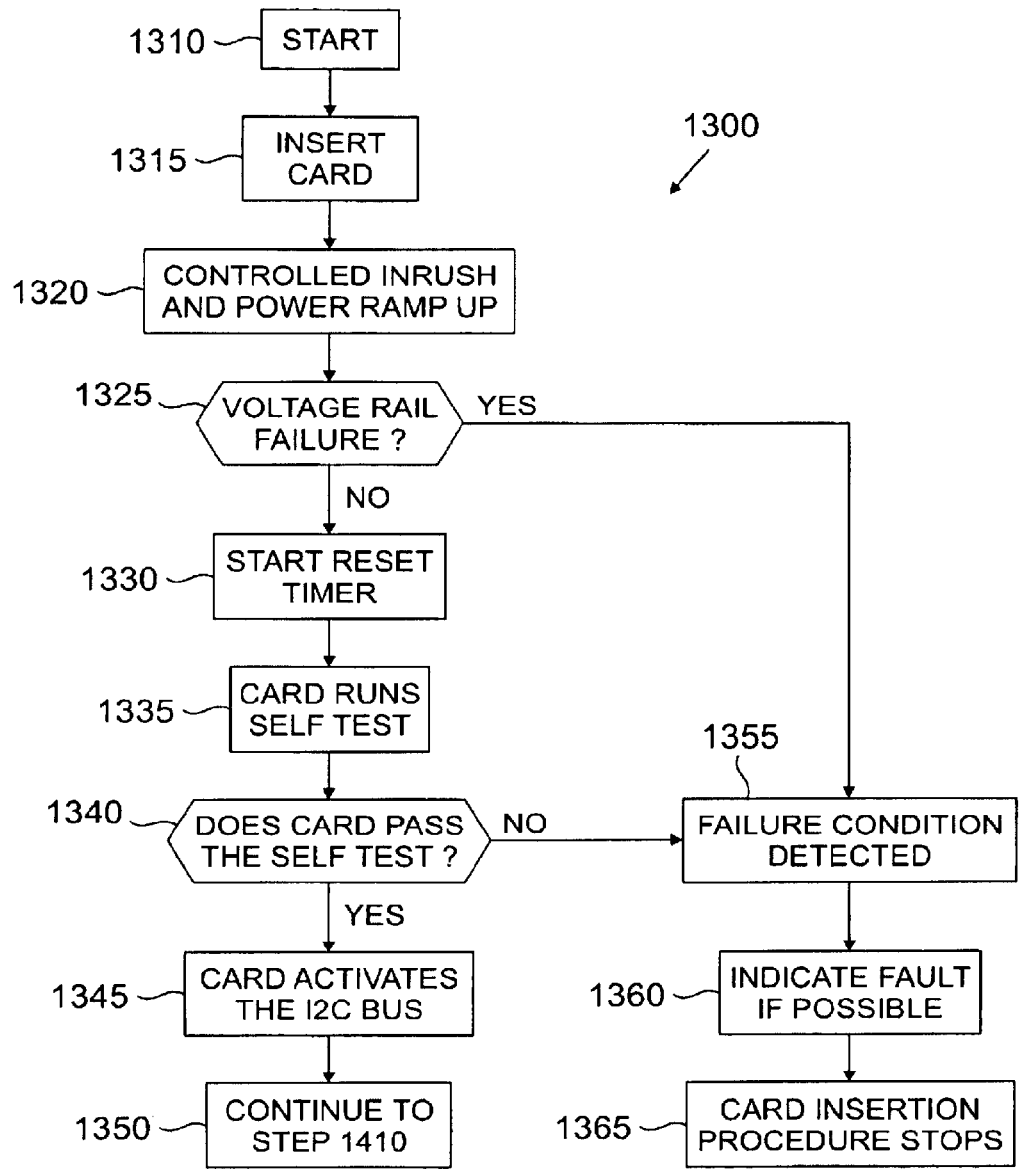
FIG. 13 illustrates a flow diagram showing a first portion of the method of the present invention.

FIG. 13 illustrates a flow diagram showing a first portion of the method of the present invention. The steps of the first portion of the method of the present invention will be generally denoted with reference numeral 1300. The start of the method is denoted with reference numeral 1310. Card 800 is inserted in backplane 210 (step 1315). "Hot swap" power/in rush controller 1015 of card 800 then provides a controlled power ramp up (step 1320). A determination is then made to detect whether a voltage rail has failed (decision step 1325).

If a voltage rail has failed, then a failure condition has been detected (step 1355). If possible, the particular fault is identified (step 1360), and the insertion procedure for card 800 is stopped (step 1365).

If no voltage rail has failed, then the reset timer is started (step 1330). Card 800 then runs a Power On Self Test (POST) (step 1335). A determination is then made whether card 800 passed the Power On Self Test (decision step 1340).

If card 800 fails the Power On Self Test, then a failure condition has been detected (step 1355). If possible, the particular fault is identified (step 1360), and the insertion procedure for card 800 is stopped (step 1365).

If card 800 passes the Power On Self Test, then card 800 activates common control bus 530 (I²C Bus) (step 1345). The next step transfers control to step 1410 (of FIG. 14) (step 1350).

Figure 14:
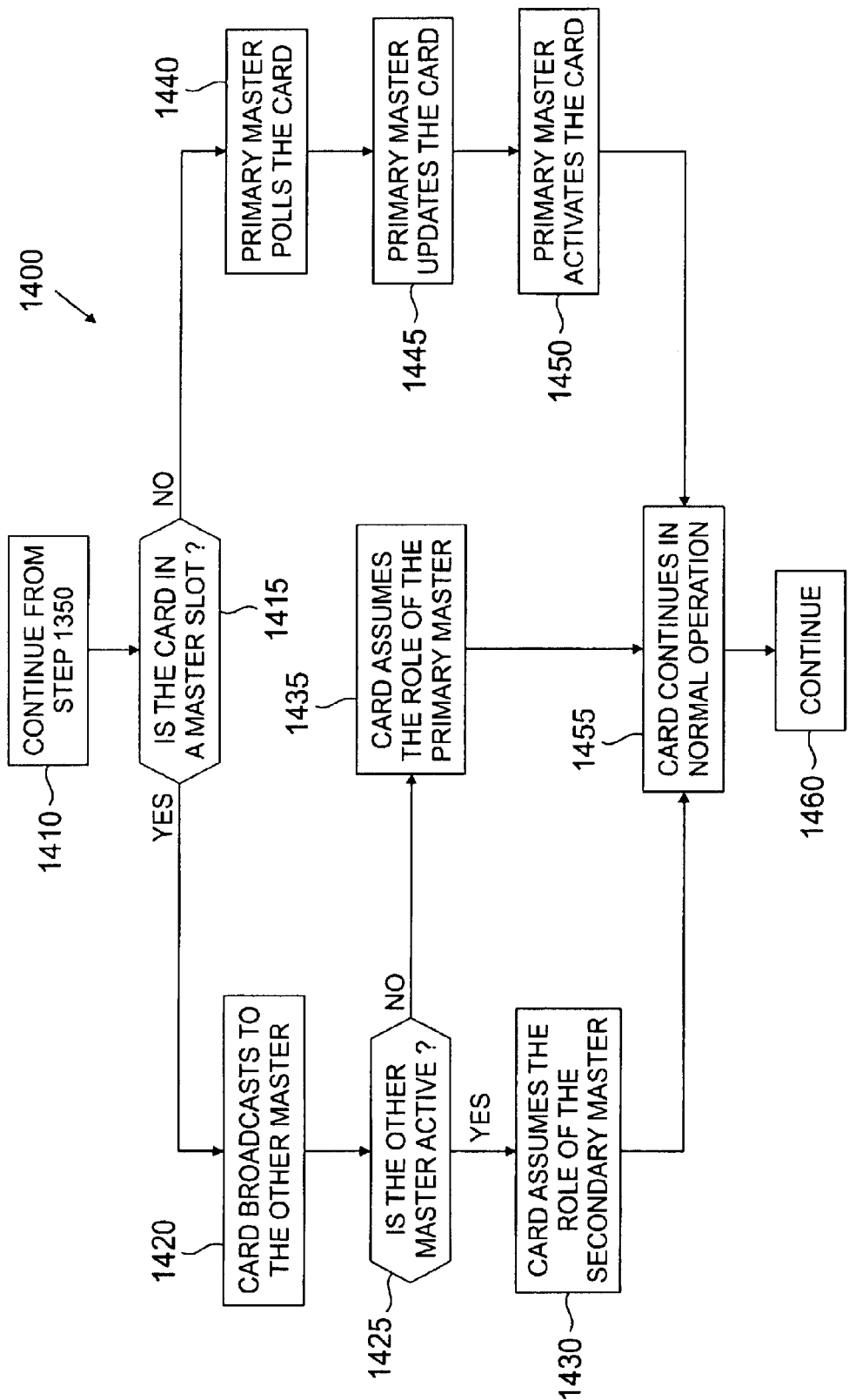
FIG. 14 illustrates a flow diagram showing a second portion of the method of the present invention.

FIG. 14 illustrates a flow diagram showing a second portion of the method of the present invention. Control is transferred from step 1350 (of FIG. 13) (step 1410). A determination is then made whether card 800 is located in a master slot (decision step 1415). If card 800 is not located in a master slot, then card 800 is not a master controller card. Card 800 then waits to be polled (i.e., interrogated) by a master controller card. The primary master controller 230 then polls card 800 (step 1440). Primary master controller 230 then configures card 800 by updating software, etc. (step 1445). Primary master controller 230 then activates card 800 (step 1450). Card 800 then continues in normal operation (step 1455) and the method steps continue as other cards are inserted in backplane 210 (step 1460).

If card 800 is located in a master slot, then card 800 is a master controller card. Card 800 then sends a signal to the other master controller card (step 1420). Card 800 then determines whether the other master controller card is active (decision step 1425). If the other master controller card is active, then card 800 assumes the role of the secondary master controller card (step 1430). Card 800 as secondary master controller card continues in normal operation (step 1455) and the method steps continue as other cards are inserted in backplane 210 (step 1460).

If the other master controller card is not active, then card 800 assumes the role of the primary master controller card (step 1435). Card 800 as primary controller card continues in normal operation (step 1455) and the method steps continue as other cards are inserted in backplane 210 (step 1460).

In this manner the method of the present invention provides an automated boot procedure for a card to determine (1) whether it is a master controller card, and (2) if it is a master controller card, whether it is a primary or secondary master controller card. The method of the present invention insures that a primary master controller card will ensure that each card 800 that is inserted into backplane 210 is tested and properly configured before it is allowed access to the rest of the cards in backplane 210.

Although the present invention has been described in detail, those skilled in the art should understand that they can make various changes, substitutions and alterations herein without departing from the spirit and scope of the invention in its broadest form.

What is claimed is:

1. For use in association with a backplane of an item of electronic equipment wherein said backplane comprises a common control bus that can access a first number of card locations, an apparatus capable of allowing said common control bus to access more than said first number of card locations, said apparatus comprising:

a complex programmable logic device on a circuit board card within said backplane, wherein said complex programmable logic device is coupled to said common control bus, and wherein said complex programmable logic device is capable of coupling each of one or more devices on said circuit board card to said common control bus in a manner allowing said common control bus to access more than said first number of card locations.

2. The system as set forth in claim 1 wherein said complex programmable logic device controls the access of a device to said common control bus when a card location for said device is coupled to said common control bus.

3. The system as set forth in claim 1 wherein said complex programmable logic device couples devices on said circuit board card to said common control bus to allow said common control bus to access a second number of card locations through complex programmable logic devices on each circuit board card within one of the second number of card locations.

4. The apparatus as set forth in claim 1 further comprising:
a card processor on said circuit board card within said backplane, said card processor coupled to said common control bus.

5. The apparatus as set forth in claim 1 wherein said common control bus comprises a first two wire bus and a second two wire bus, and wherein said apparatus comprises:
a card processor on said circuit board card within said backplane, said card processor coupled to said first two wire bus and to said second two wire bus of said common control bus through metal oxide semiconductor field effect transistor switches; and
an electrically erasable programmable read only memory on said circuit board card, said electrically erasable programmable read only memory coupled to said first two wire bus and to said second two wire bus of said common control bus through metal oxide semiconductor field effect transistor switches,
wherein said complex programmable logic device is coupled to said first two wire bus and to said second two wire bus of said common control bus through metal oxide semiconductor field effect transistor switches.

6. The system as set forth in claim 3 wherein said complex programmable logic device provides access to a number of circuit board cards within said card locations that is greater than said first number of device locations that said common control bus can otherwise access.

7. The apparatus as set forth in claim 4 wherein said card processor is coupled to said common control bus through a serial clock line connection and through a serial data line connection.

8. The apparatus as set forth in claim 5 wherein said complex programmable logic device controls the access of said electrically erasable programmable read only memory to said first two wire bus and to said second two wire bus of said common control bus.

9. The apparatus as set forth in claim 4 further comprising:
an electrically erasable programmable read only memory on said circuit board card, said electrically erasable programmable read only memory coupled to said common control bus,
wherein said complex programmable logic device controls the access of said electrically erasable programmable read only memory to said common control bus when said electrically erasable programmable read only memory is coupled to said common control bus.

10. The apparatus as set forth in claim 9 wherein said electrically erasable programmable read only memory is coupled to said common control bus through a serial clock line connection and through a serial data line connection.

11. The apparatus as set forth in claim 9 wherein said complex programmable logic device is coupled to said common control bus through a serial clock line connection and through a serial data line connection.

12. For use in association with a backplane of an item of electronic equipment wherein said backplane comprises a common control bus that can access a first number of card locations, a method for allowing said common control bus to access more than said first number of card locations, said method comprising:
coupling, in a manner allowing said common control bus to access more than said first number of card locations, each one of a plurality of card locations to said common control bus through a complex programmable logic device on a circuit board card at said one of a plurality of card locations; and
controlling the access of a device on said circuit board card to said common control bus with said complex programmable logic device when a card location of a circuit board containing said device is coupled to said common control bus.

13. The method as claimed in claim 12 further comprising:
coupling a second number of card locations to said common control bus through a complex programmable logic device on a circuit board card in each of said second number of card locations.

14. The method as claimed in claim 12 further comprising:
coupling a card processor on said circuit board card within said backplane to said common control bus;
providing clock signals to said card processor from a serial clock line coupled to said common data bus;
reading data from said card processor on a serial data line coupled to said common data bus; and
writing data to said card processor from said serial data line.

15. The method as set forth in claim 12 further comprising:
coupling a electrically erasable programmable read only memory on said circuit board card within said backplane to said common control bus;
providing clock signals to said electrically erasable programmable read only memory from a serial clock line coupled to said common data bus;
reading data from said electrically erasable programmable read only memory on a serial data line coupled to said common data bus; and
writing data to said electrically erasable programmable read only memory from said serial data line.

16. The method as set forth in claim 13 wherein said one or more devices on a circuit board card within each of said first number of card locations accesses circuit board cards in a number of card locations greater than said first number of card locations through said complex programmable logic device.

17. The method as set forth in claim 15 further comprising:
controlling the access of said electrically erasable programmable read only memory to said common control bus with said complex programmable logic device.

18. For use in association with a backplane of an item of electronic equipment wherein said backplane comprises a common control bus that can access a first number of device locations, a method for allowing said common control bus to access more than said first number of device locations, said method comprising:
selectively coupling a first device on a circuit board card within said backplane to said common control bus;
coupling a complex programmable logic device on said circuit board card to said common control bus and to said first device, wherein said complex programmable logic device controls selective coupling of said first device on said circuit board card to said common control bus;
receiving data in said complex programmable logic device through a serial data line coupled to said common data bus; and
interpreting instructions in said data to allow said complex programmable logic device to control data access to said first device.

19. The method as set forth in claim 18 further comprising:
- interpreting in said complex programmable logic device a first portion of a first byte of said data to identify a card address for said first device;
- interpreting in said complex programmable logic device a second portion of said first byte of said data to identify a device code of said first device; and
- interpreting in said complex programmable logic device a third portion of said first byte of said data to identify an instruction to read data or write data to said first device.

20. The method as set forth in claim 19 wherein said first device is one of: an electrically erasable programmable read only memory, a card processor, a card status register, and a card control register.

* * * * *